(12) United States Patent
Watanabe et al.

(10) Patent No.: US 8,131,773 B2
(45) Date of Patent: Mar. 6, 2012

(54) SEARCH INFORMATION MANAGING FOR MOVING IMAGE CONTENTS

(75) Inventors: Shuichi Watanabe, Chiba (JP); Yasuaki Tokumo, Chiba (JP); Hiroyuki Okada, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 291 days.

(21) Appl. No.: 10/399,735

(22) PCT Filed: Oct. 18, 2001

(86) PCT No.: PCT/JP01/09161
§ 371 (c)(1),
(2), (4) Date: Sep. 12, 2003

(87) PCT Pub. No.: WO02/33589
PCT Pub. Date: Apr. 25, 2002

(65) Prior Publication Data
US 2004/0054668 A1    Mar. 18, 2004

(30) Foreign Application Priority Data

Oct. 20, 2000  (JP) .................................. 2000-320185
Apr. 3, 2001   (JP) .................................. 2001-104010

(51) Int. Cl.
*G06F 7/00*    (2006.01)
*G06F 17/00*   (2006.01)
*G06K 9/46*    (2006.01)

(52) U.S. Cl. ......... 707/802; 707/693; 707/778; 382/190
(58) Field of Classification Search .................. 707/802, 707/693, 778; 382/190
See application file for complete search history.

(56) References Cited

FOREIGN PATENT DOCUMENTS

| EP | 1 073 223 A1 | 1/2001 |
|---|---|---|
| JP | 61-267129 | 11/1986 |
| JP | 11-288424 | 10/1999 |
| JP | 2000-148796 | 5/2000 |
| JP | 2000-224257 | 8/2000 |

OTHER PUBLICATIONS

"Multimedia Search and Retrieval", By: Chang, Published 2000 http://userpages.umbc.edu/~nikunj1/survey/chapter-99.pdf.*

(Continued)

*Primary Examiner* — Apu Mofiz
*Assistant Examiner* — Chelcie Daye
(74) *Attorney, Agent, or Firm* — Edwards Wildman Palmer LLP; David G. Conlin; David A. Tucker

(57) ABSTRACT

A search information analyzing unit (101) separates search information (15) into structured search information (152) representing a structure of moving image contents, semantic search information (153) representing characteristics in semantic context of the moving image contents, and signal search information (154) representing physical characteristics of signals of the moving image contents, and outputs the results. A structural search information disassembling unit (102) extracts and outputs, from the applied structural search information, information corresponding to at least one of the semantic search information and signal search information as structural information (50). A unit search information forming unit (103, 104) adds, to at least one of the applied semantic search information and signal search information, to form a small unit of search information (153A, 154A). Such a small unit of search information can be used as search information for the moving image contents, and hence, the amount of search information can be reduced.

21 Claims, 14 Drawing Sheets

OTHER PUBLICATIONS

"Management of Multi-Structured Hypermedia Documents: Data Model, Query Language, and Indexing Scheme", By: Lee, Published 1997 http://www.springerlink.com/content/q12312882270n3q7/fulltext.pdf.*

European Search Report dated Dec. 16, 2004.

Girardot, et al., "Efficient Representation and Streaming of XML content over the Internet Medium," IEEE International Conference 1:67-70 (2000).

Grosso, et al., "XML Fragment Interchange," World Wide Web Consortium (1999), 17 pages.

Martinez, "Overview of the MPEG-7 Standard," XP000997444, pp. 1-41 (2000).

Chang, et al., "Multimedia Search and Retrieval," XP001112907, (2000), pp. 559-584.

Paek, et al., "Self-Describing Schemes for Interoperable MPEG-7 Multimedia Content Descriptions," Proceedings of the SPIE, XP000863358, 3653:1518-1530 (1999).

Salembier, et al., "Description Schemes for Video Programs, Users and Devices," Signal Processing. Image Communication, Elsevier Science Publishers, XP004216277, 16:211-234 (2000).

Lee, et al., "Management of Multi-Structured Hypermedia Documents: Data Model, Query Language, and Indexing Scheme," Multimedia Tools and Applications, XP001001459, 4:199-223 (1997).

Azami, et al., "Dividing Methods for MPEG-7 Description," International Organisation for Standardisation, pp. 1-8 (2000).

"Report of $53^{rd}$ WG 11 Meeting," pp. 6, 8, 13, 18, 34, 44, & 57 (2000). Please see European Search Report.

The Journal of the Institute of Image Electronics Engineers of Japan, 28:552-559 (1999).

Nakajima, et al., "XML Ticket: Rights Definition Language with Secure Inheritance," IPSJ, 2000:243-250 (2000).

Kurioka, et al., DAVIC no nokoshitamono,"The Journal of the Institute of Image Information and Television Engineers," 53:1666-1673 (1999).

Ricoh Technical Report—No. 25, pp. 33-39 (1999).

"Making Use of XML in WWW," Shigeru Kobayashi, Tokyo Denki University Press, Apr. 20, 1999, 1st Edition, pp. 26-32.

U.S. Office Action in U.S. Appl. No. 10/399,733 dated Jan. 14, 2011.

Rehbati H.K.: "An Overview of Data Compression Techniques", Computer, IEEE Service Center, vol. 14, No. 4, Apr. 1, 1981, pp. 71-75, XP000561223, ISSN: 0018-9162.

U.S. Office Action dated Mar. 22, 2011 for U.S. Appl. No. 10/399,733.

* cited by examiner

| STRUCTURAL SEARCH INFORMATION: MOVING IMAGE (AS A WHOLE) |
| --- |
| SEMANTIC SEARCH INFORMATION: TITLE |
| PRODUCER |
| SIGNAL SEARCH INFORMATION: ... |
| STRUCTURAL SEARCH INFORMATION: SCENE #1 |
| START/END TIME #1 |
| SEMANTIC SEARCH INFORMATION: SCENE TITLE #1 |
| VISUAL SCENIC DESCRIPTION #1 |
| SIGNAL SEARCH INFORMATION: REPRESENTATIVE COLOR #1 |
| STRUCTURAL SEARCH INFORMATION: SHOT #1-1 |
| START/END TIME #1-1 |
| SEMANTIC SEARCH INFORMATION: CHARACTER #1-1 |
| ACTION DESCRIPTION #1-1 |
| REPRESENTATIVE FRAME #1-1 |
| SIGNAL SEARCH INFORMATION: COLOR FREQUENCY #1-1 |
| MOTION INTENSITY #1-1 |

| STRUCTURAL SEARCH INFORMATION: SHOT #1-2 |
| --- |
| START/END TIME #1-2 |
| SEMANTIC SEARCH INFORMATION: CHARACTER #1-2 |
| ACTION DESCRIPTION #1-2 |
| REPRESENTATIVE FRAME #1-2 |
| SIGNAL SEARCH INFORMATION: COLOR FREQUENCY #1-2 |
| MOTION INTENSITY #1-2 |

| STRUCTURAL SEARCH INFORMATION: SHOT #1-3 |
| --- |
| START/END TIME #1-3 |
| SEMANTIC SEARCH INFORMATION: CHARACTER #1-3 |
| ACTION DESCRIPTION #1-3 |
| REPRESENTATIVE FRAME #1-3 |
| SIGNAL SEARCH INFORMATION: COLOR FREQUENCY #1-3 |
| MOTION INTENSITY #1-3 |

| STRUCTURAL SEARCH INFORMATION: SCENE #2 |
| --- |
| START/END TIME #2 |
| SEMANTIC SEARCH INFORMATION: SCENE TITLE #2 |
| VISUAL SCENIC DESCRIPTION #2 |
| SIGNAL SEARCH INFORMATION: REPRESENTATIVE COLOR #2 |
| STRUCTURAL SEARCH INFORMATION: SHOT #2-1 |
| START/END TIME #2-1 |
| SEMANTIC SEARCH INFORMATION: CHARACTER #2-1 |
| ACTION DESCRIPTION #2-1 |
| REPRESENTATIVE FRAME #2-1 |
| SIGNAL SEARCH INFORMATION: COLOR FREQUENCY #2-1 |
| MOTION INTENSITY #2-1 |

SEARCH INFORMATION MANAGING FOR MOVING IMAGE CONTENTS

TECHNICAL FIELD

The present invention relates to apparatus and method for managing information having a tree structure (hereinafter referred to as search information) for searching for moving image contents, and to a search apparatus executing a search process. More specifically, the present invention relates to search information managing apparatus and method enabling efficient storage or transmission of search information, as well as to a search apparatus executing a search process using the search information.

BACKGROUND ART

For moving image contents, every time point or every spatial point (image plane) of the moving image contents can be an object of search. Therefore, in order to execute an exact search, it is necessary to playback the moving image contents as a whole and to check in detail. Such a method of searching, however, is not at all efficient, and when the number of moving image contents as the target of search increases, the method would be even less practical.

Various methods have been proposed as methods enabling a user to quickly and efficiently search for desired moving image contents or a desired portion of the moving image contents, in which search information (which search information is also referred to as metadata for search) to be. added to corresponding moving image contents is prepared, a search is executed based on the search information, and the desired moving image contents or the desired portion of the moving image contents is obtained.

FIG. 10 shows a schematic structure of general moving image contents. Such a structure is widely known and disclosed, for example, in Japanese Patent Laying-Open Nos. 10-108071 and 10-257436.

As can be seen from FIG. 10, the entire moving image is divided, along time, into a number of scenes. Here, the term scene refers to a section mainly of a semantic unity along the time axis, and scenes may include large sections such as part 1 and part 2 of a movie as well as a very small section such as a scene of "A and B fighting against each other." Therefore, the actual division of the entire moving image into scenes is not limited to one stage division such as shown in FIG. 13, but rather proceeds gradually over a plurality of stages.

One scene is further divided into a number of shots (or into smaller scenes) along the time axis. Here, the term shot refers to one section along time consisting of continuous frame images picked-up by one operation, and in the moving images, it refers to a section between two editing points (cut points).

A shot is a kind of a scene, and the shot may further be divided into smaller shots (sub-shots). Though not shown, the shot can eventually be divided into one-by-one frame images.

In this manner, the moving image contents has a hierarchical structure divided from the entire body to small portions and further to smaller portions. Corresponding search information is added to each level of the hierarchy.

FIG. 11 represents search information for the moving image contents of FIG. 10. The search information of moving image contents is represented by a tree structure such as shown in FIG. 11. The search information of moving image contents includes structural search information, semantic search information and signal search information.

The structural search information refers to information representing the hierarchical structure of the moving image contents shown in FIG. 10. The structural search information includes structuring information for representing the tree structure, that is, relation between various scenes or shots of the entire moving images, and structural attribute information representing attribute of each scene or shot resulting from the division.

In the tree of FIG. 11, the root R represents the entire moving images, and each node ND represents each scene or shot obtained by the division. A node ID or level information appended to the root R or to each node ND constitutes the structuring information, and a start time, end time information or the like appended to each scene or shot constitutes the structural attribute information.

The semantic search information refers to search information defined by semantic characteristics of the moving image contents. For example, the title of the entire moving image contents, information of a producer, and information of visual scenic description of a scene constitute the semantic search information.

The signal search information refers to search information defined by physical characteristics of signals of the moving image contents. For example, color frequency information, motion intensity information or the like for each shot (or for a representative frame image thereof) constitutes the signal search information. The semantic search information and signal search information are provided as leaves RF linked to each corresponding node ND.

FIG. 12 represents the manner of recording when the search information having the tree structure shown in FIG. 11 is recorded. As can be seen from FIG. 12, the search information having the tree structure shown in FIG. 11 is recorded by tracing the root R and the nodes ND from shallow to deeper levels of the hierarchy (along the direction from the root R to the nodes ND), and from left to right (earlier time point to later time point), with priority given to the depth (when there is no node ND any longer to be traced in the lower level of one node ND, tracing is switched to a neighboring node ND on the right side), and the search information as the leaf RF added to the root R or the node ND is recorded successively.

Though the highest level (root R) is shown as representing one, entire moving image content in FIGS. 10 to 12, it is not limited to one moving image content, and it may be considered as a set of a plurality of moving image contents. By way of example, the highest level may be video programs as a whole that are broadcast in one day on one channel. The video programs as a whole broadcast in one day on one channel are divided into programs one by one, that is, respective moving image contents, in the next level. Each of the moving image contents is divided into a plurality of scenes, and each scene is divided into a plurality of shots.

By the search information having the tree structure, it becomes possible to present the structure of the moving image contents along time in a form easily understandable by the user, associated with various pieces of search information. Therefore, the search information is well suited for operations such as editing of the corresponding moving image contents by the user with visual confirmation based on the search information, or editing of the search information itself. It is noted, however, that when the size of the moving image contents becomes large, the size of the tree representing the search information also becomes very large.

Assume an execution model in which moving image contents and search information are stored in a server apparatus, a user accesses from a client terminal to the server, obtains the search information and executes a search at the client terminal. Here, a situation is not desirable in which a formidable amount of search information must be fully obtained by the client terminal from the server before the user can start operation of the client terminal to execute a search. Specifically, it is desired that the search information having the tree structure is divided into an appropriate plurality of small units of search information and transmitted to the client terminal, and that the user can execute a search to some extent at the client terminal utilizing the received small units of search information.

By dividing the search information having the tree structure in accordance with sections along time axis into scenes or shots conventionally, it is possible to form small units 11 to 14 of search information shown in FIGS. 13A to 13D. The small units of search information 11 to 14 can be obtained by dividing the search information into a set of a node ND and its leaves RF starting from each of the lowermost nodes ND of the tree, or a set of nodes ND and their leaves RF including a lowermost node and connected higher levels nodes ND, as shown in FIG. 14.

The small unit of search information obtained by division in accordance with section along time holds the information of time structure of the corresponding moving image contents as it is, and therefore, it can be suitably used for transmission in synchronization with the moving image contents, to enable filtering of the moving image contents on-line, based on the search information.

As disclosed in Japanese Patent Laying-Open No. 8-110912, it is well known to store the search information having the tree structure divided into the tree structure and a table of appended information representing attribute information of each of the nodes ND of the tree structure. According to this approach, there are two divisible units, that is, the tree structure and the table. The appended information table, however, cannot be handled independently, and the above described division along time section is not available.

In the present specification, the above described small unit of search information obtained by the division will be referred to as "unit search information." Further, node ID information or the like for uniquely identifying a node ND of the structural search information will be referred to as "search information element" of the structural search information (or structural search information element), action description information or the like of the semantic search information will be referred to as "search information element" of the semantic search information (or semantic search information element), and each of color frequency information, motion intensity information and the like of the signal search information will be referred to as "search information element" of the signal search information (or signal search information element).

The small unit of search information conventionally obtained by dividing the search information having the tree structure is unit search information corresponding to the time section, that is, the structural element of the moving image contents such as a scene or a shot.

In such unit search information, however, search information elements of the structural search information, semantic search information and signal search information exist in a complicated manner. There may be, for example, a request that only the structural search information of the moving images is to be known (it is desired to know how the moving images are divided into scenes or shots). Alternatively, there may be a request that only the color frequency information of each shot is desired to conduct a search based on color frequency information shot by shot, or a request that only the motion intensity information is desired to conduct a search based on the motion intensity information shot by shot. Conventionally, a searcher must obtain the unit search information that includes the search information elements of the structural search information, semantic search information and signal search information existing in a complicated manner, and the searcher must analyze and use the obtained information to meet such requests.

It is efficient from the view point of a searcher that search information elements of the same type (type such as the color frequency information or motion intensity information) added to respective shots or respective scenes are obtained collectively for a plurality of shots or a plurality of scenes as the components of the moving images, and that a search can be conducted by comparing and collating the same type of information elements. For example, using the color frequency information among the signal search information elements, a shot can be searched by detecting one that has color frequency information matching to a desire among color frequency information added to the shots.

Though Japanese Patent Laying-Open No. 8-110912 contains a hint to handle only the tree structure separate from the search information, it does not suggest handling of other appended information independently, or division and management based on detailed types of search information such as described above.

The search information elements of the structural search information and the signal search information are generally given in fixed formats. In contrast, the search information elements of the semantic search information often include free text data and the like of unfixed length, such as the data of action description.

Therefore, when the search information contains a plurality of search information elements in a complicated manner, it is necessary to analyze each of the structural search information, signal search information and the semantic search information even if only the search information elements of the structural search information and the signal search information of the fixed length are to be drawn out. This imposes a considerable burden on the searcher.

In contrast, when the search information is formed by collecting only the signal search information elements, the search information can be handled easily, for example, by skipping data of a fixed length.

As compared with the manner of search in which the search information is obtained containing the structural search information, semantic search information and signal search information in a complicated manner in accordance with time structure, the manner of search in which the structural search information is obtained to enable understanding of the structure of the moving images as a whole, and the signal search information or the semantic search information is added as needed to proceed with the search is very natural. The conventional method of dividing the search information, however, is not suitable for the latter manner of searching.

The unit of search information conventionally obtained by division of the search information having the tree structure holds the information of time structure of the corresponding moving image contents as it is, and therefore, it is suitable for a manner of search in which the search information is transmitted in parallel with moving image contents, to enable filtering by an on-line search. When a large amount of data of moving image contents must be searched off-line, for example, and a desired shot is to be searched for simply by using specific search information such as the color frequency information added to the entire moving image contents, it has been necessary to read and analyze all the search information, in order to draw out the specific necessary search information. Accordingly, there are many wasteful processes.

For an off-line search, it is natural to obtain only the search information of the same type added to a plurality of moving image components, such as a plurality of shots, and to compare and collate the same to conduct a search. By way of example, a server apparatus may draw out and transmit to a client terminal only the color frequency information added to each of the plurality of shots, among the signal search information elements, the client terminal receives the color frequency information, and the user detects a desired shot based on the received color frequency information and requests the server apparatus only the data of the corresponding shot.

As described above, the manner of division of the search information for moving image contents should be switched in accordance with the manner of search. Conventionally, however, such a consideration has not been made.

DISCLOSURE OF THE INVENTION

An object of the present invention is to provide a search information managing apparatus and a search information managing method that enable efficient use of search information having a tree structure added to moving image contents, as well as to provide a search apparatus that is capable of executing an efficient search process.

According to an aspect of the present invention, the search information managing apparatus includes a separating unit, a structural information extracting unit and a unit search information forming unit, for managing the search information having the tree structure corresponding to the moving image contents divided into small units of search information.

The separating unit separates the search information into structural search information representing the structure of the moving image contents, semantic search information representing characteristics in semantic context of the moving image contents, and signal search information representing physical characteristics of signals of the moving image contents, and outputs the same. The structural information extracting unit disassembles the structural search information output from the separating unit, and from the disassembled structural search information, extracts information that corresponds to at least one of semantic search information and signal search information. The unit search information forming unit forms a small unit of search information by adding to at least one of the semantic search information and signal search information output from the separating unit the corresponding structural information extracted by the structural information extracting unit.

Therefore, a small unit of search information provided by adding to at least one of the semantic search information and signal search information separated from the search information the corresponding structural information extracted by the structural information extracting unit can be used as the search information for the moving image contents, and hence, the amount of search information can be reduced. Accordingly, when a small unit of search information requested by a searcher at the time of searching for moving image contents is to be formed and transmitted to the source of request, the amount of search information to be transmitted can be reduced.

According to another aspect of the present invention, the search information managing apparatus includes a separating unit, a structural information extracting unit and a unit search information forming unit, for managing the search information having the tree structure corresponding to the moving image contents divided into small units of search information.

The separating unit separates and draws out from the search information, one or a plurality of search information elements given by one or a plurality of leaves of the tree structure or given by one or a plurality of sub-trees consisting of an arbitrary set of a node and leaves or nodes of lower levels linked to the node of the tree structure, representing elements of the same type included in the search information. The structural information extracting unit extracts, from the search information, structural information corresponding to the one or a plurality of search information elements drawn out by the separating unit. The unit search information forming unit forms a small unit of search information by arranging the one or a plurality of search information elements drawn out by the separating unit and the corresponding structural information extracted by the structural information extracting unit in accordance with a prescribed format.

Thus, a small unit of search information is formed by arranging the one or a plurality of search information elements drawn out from the original search information and the corresponding structural information in accordance with a prescribed format, and therefore, each of the search information elements included in the small unit of search information can easily be specified. Accordingly, the small unit of search information can easily be used at the time of executing a search for moving image contents.

In the above described search information managing apparatus, one or a plurality of search information elements drawn out by the separating unit may correspond to the signal search information representing physical characteristics of signals of the moving image contents.

As the signal search information representing physical characteristics of signals of the moving image contents is used as the small unit of search information, it becomes possible when, for example, the moving image contents are to be searched using the color frequency information only, to use only the corresponding color frequency information for transmission or search, and thus, an efficient search using only the signal search information can be realized.

In the above described search information managing apparatus, one or a plurality of search information elements drawn out by the separating unit may correspond to the semantic search information representing characteristics in semantic context of the moving image contents.

As the semantic search information representing characteristics in semantic context of the moving image contents is used as the small unit of search information, it becomes possible when, for example, the moving image contents are to be searched using characters of each scene only, to use only the information of corresponding characters for transmission or search. Thus, an efficient search using only the semantic search information can be realized.

In the above described search information managing apparatus, the prescribed format may represent an arrangement of one or a plurality of search information elements drawn out by the separating unit and the corresponding structural information extracted by the structural information extracting unit, in accordance with order of appearance of the one or a plurality of search information elements within the tree structure.

As the one or a plurality of search information elements and the corresponding structural information constituting the small unit of search information are arranged in accordance with the order of appearance in the tree structure, information representing preceding/succeeding relation of each of the search information elements can be omitted. Accordingly, it becomes possible to reduce the signal amount of a small unit of search.

In the above described search information managing apparatus, the small unit of search information may further be formed in the following manner. Specifically, the structural information extracting unit separates the structural information into shared structural information including type information shared by the one or a plurality of search information elements drawn out by the separating unit or shared position information of the tree structure, and un-shared structural information other than the shared structural information. A small unit of search information may be formed by arranging, in addition to the arrangement of the one or a plurality of search information elements drawn out by the separating unit, the corresponding shared structural information and the corresponding unshared structural information.

Therefore, the type information representing whether the search information element represents color frequency or character information, or the position information representing at which level of the tree structure the search information element is connected, shared by the search information elements of the same type, is added to the arrangement of the one or a plurality of search information elements. Therefore, the type or the corresponding level of the tree structure can easily be known for the search information element included in the small unit of search information.

In accordance with a further aspect of the present invention, the search information managing apparatus includes, for forming small units of search information from search information having a tree structure corresponding to moving image contents and for managing the same, a record position information extracting unit, a structural information extracting unit and a unit search information forming unit.

The record position information extracting unit extracts, for each of one or a plurality of search information elements given by one or a plurality of leaves of the tree structure or given by one or a plurality of sub-trees consisting of an arbitrary set of a node and leaves or nodes of lower levels linked to the node of the tree structure, representing elements of the same type included in the search information, record position information representing the position where the search information element is recorded. The structural information extracting unit extracts, from the search information, structural information corresponding to the one or a plurality of search information elements. The unit search information forming unit forms a small unit of search information by arranging the record position information extracted by the record position information extracting unit and the structural information extracted by the structural information extracting unit corresponding to each of the one or a plurality of search information elements, in accordance with a prescribed format.

Therefore, the one or a plurality of search information elements represented by the small unit of search information can be specified by the record position information arranged in the small unit of search information, and the search information elements can easily be used at the time of executing a search for the moving image contents. When a small unit of search information is requested for searching for moving image contents and the small unit of search information is transmitted to the source of request, it is possible for the source of request to specify the desired search information element by the record position information in the received small unit of search information without the necessity of transmitting the search information element itself. Further, by transmitting only the desired search information element at every request to the source of request, a highly efficient search becomes possible.

In the above described search information managing apparatus, the one or a plurality of search information elements may correspond to the signal search information representing physical characteristics of the signals on the moving image contents.

As the signal search information representing physical characteristics of signals of the moving image contents is used as the search information element corresponding to the record position information, it becomes possible when, for example, a search is conducted using the color frequency information only, to use only the corresponding color frequency information for transmission or search, and thus, an efficient search using only the signal search information can be realized.

In the above described search information managing apparatus, the one or a plurality of search information elements may correspond to the semantic search information representing characteristics in semantic context of the moving image contents. As the semantic search information representing characteristics in semantic context of the moving image contents can be used as the search information element corresponding to the record position information, it becomes possible when, for example, a search is conducted using characters of each scene only, to use only the information of corresponding characters for transmission or search. Thus, an efficient search using only the semantic search information can be realized.

In the above described search information managing apparatus, the prescribed format may represent an arrangement of respective record position information in accordance with the order of appearance in the tree structure of respective ones of the corresponding one or a plurality of search information elements.

Therefore, in the small unit of search information, information representing preceding/succeeding relation of each of the corresponding search information elements can be omitted. Accordingly, it becomes possible to reduce amount of information of the small unit of search information.

In the above described search information managing apparatus, the structural information extracting unit further separates the structural information into shared structural information and un-shared structural information other than the shared structural information. The shared structural information includes information representing type shared by the one or a plurality of search information elements, or shared position information in the tree structure.

A small unit of search information may be formed by arranging, in addition to the arrangement of the record position information corresponding to the one or a plurality of search information elements, the corresponding shared structural information and the corresponding unshared structural information, respectively.

Therefore, the type information representing whether the search information element represents color frequency or character information, or the position information representing at which level of the tree structure the search information element is connected, shared by the search information elements of the same type, is arranged added to the arrangement of the record position information. Therefore, the type or the corresponding level of the tree structure can easily be known for the search information element represented by the record position information included in the small unit of search information.

In accordance with a further aspect of the present invention, the search information managing apparatus includes, for managing the search information having a tree structure corresponding to moving image contents divided into small units of search information, first and second search information dividing units and a division selecting unit.

The first search information dividing unit divides the search information into structural search information representing the structure of the moving image contents, semantic search information representing characteristics in semantic context of the moving image contents, and signal search information representing physical characteristics of signals of the moving image contents, extracts, from the structural search information obtained by the division, information corresponding to the semantic search information and the signal search information, respectively, and forms small units of search information by adding the extracted structural information to the semantic search information and the signal search information obtained by the division, respectively.

The second search information dividing unit divides the search information along time section based on the tree structure, and forms, from divided search information, small units of search information.

The division selecting unit selects whether the search information is to be divided by the first search information dividing unit or the second search information dividing unit, in accordance with the desired manner of search.

Therefore, when the search information having the tree structure corresponding to the moving image contents is to be divided into small units of search information and managed, it is possible to selectively form, in accordance with the desired manner of search, a small unit of search information in accordance with one format or a small unit of search in accordance with the other format. The one format is associated with the type of the search information. Specifically, according to this format, the search information is divided into structural search information, semantic search information and signal search information, from the structural search information obtained by the division, information corresponding to the semantic search information and the signal search information are extracted respectively, and the extracted structural information is added to the semantic search information and the signal search information respectively. In the other format, the search information is divided along time section, and the unit information consists of the thus divided search information. As it is possible to select whether the small unit of search information is to be formed in accordance with the one format or the other format, the optimal small unit of search information can be selected dependent on the manner of search, such as an on-line search or an off-line search. Thus, a highly efficient search is realized.

According to a still further aspect of the present invention, the search information managing apparatus includes, for managing the search information having the tree structure corresponding to moving image contents divided into a small units of search information, first and second search information forming units and a selecting unit.

The first search information forming unit separates and draws out, from the search information, one or a plurality of search information elements given by one or a plurality of leaves of the tree structure or given by one or a plurality of sub-trees consisting of an arbitrary set of a node and leaves or nodes of lower levels linked to the node of the tree structure, representing elements of the same type included in the search information, extracts, from the search information, structural information corresponding to the drawn out one or a plurality of search information elements, and forms a small unit of search information by arranging the one or a plurality of search information elements and the extracted corresponding structural information in a prescribed format.

The second search information forming unit divides the search information along time section based on the tree structure, and forms, from the divided search information, small units of search information.

The selecting unit selects whether the small unit of search information is to be formed by the first search information forming unit or the second search information forming unit, in accordance with the desired manner of search.

Therefore, when the search information having the tree structure corresponding to the moving image contents is to be divided into small units of search information and managed, it is possible to form, in accordance with the desired manner of search, a small unit in accordance with one format or the other format. The one format is associated with the type of the search information. Specifically, according to this format, one or a plurality of search information elements given by one or a plurality of leaves of the tree structure or given by one or a plurality of sub-trees consisting of an arbitrary set of a node and leaves or nodes of lower levels linked to the node of the tree structure, representing elements of the same type included in the search information are drawn out, structural information corresponding to the drawn out one or a plurality of search information elements is extracted, and the one or a plurality of search information elements and the corresponding structural information are arranged in a prescribed format. In the other format, the search information is divided along time section, and the unit information is formed by the thus divided search information. As it is possible to select whether the small unit of search information is to be formed in accordance with the one format or the other format, the optimal small unit of search information can be selected dependent on the manner of search, such as an on-line search or an off-line search. Thus, a highly efficient search is realized.

According to a still further aspect of the present invention, a search information managing method includes, for managing search information having a tree structure corresponding to moving image contents divided into small units of search information, the separating step, the structural information extracting step and the unit search information forming step.

In the separating step, the search information is separated into structural search information representing the structure of the moving image contents, semantic search information representing characteristics in semantic context of the moving image contents, and signal search information representing physical characteristics of signals of the moving image contents and output.

In the structural information extracting step, the search information is disassembled, and from the disassembled structural search information, information corresponding to at least one of semantic search information and signal search information is extracted as the structural information.

In the unit search information forming step, a small unit of search information is formed by adding, to at least one of the semantic search information and signal search information separated from the search information, the corresponding structural information extracted in the structural information extracting step.

Therefore, a small unit of search information, provided by adding to at least one of the semantic search information and signal search information output from the separating unit the corresponding structural information extracted from the structural information extracting unit, can be used as the search information for the moving image contents, and hence, the amount of search information can be reduced. Accordingly, when a small unit of search information requested by a searcher at the time of searching for moving image contents is to be formed and transmitted to the source of request, the amount of search information to be transmitted can be reduced.

According to a still further aspect of the present invention, a search information managing method includes, for managing search information having a tree structure corresponding to moving image contents divided into small units of search information, the separating step, the structural information extracting step and the unit search information forming step.

In the separating step, one or a plurality of search information elements given by one or a plurality of leaves of the tree structure or given by one or a plurality of sub-trees consisting of an arbitrary set of a node and leaves or nodes of lower levels linked to the node of the tree structure, representing elements of the same type included in the search information, are separated and drawn out from the search information. In the structural information extracting step, structural information corresponding to the one or a plurality of search information elements drawn out by the separating step is extracted from the search information. In the unit search information forming step, a small unit of search information is formed by arranging, in a prescribed format, one or a plurality of search information elements drawn out by the separating step and the corresponding structural information extracted by the structural information extracting step.

Thus, a small unit of search information is formed by arranging the one or a plurality of search information elements drawn out from the original search information and the corresponding structural information in accordance with a prescribed format, and therefore, each of the search information elements included in the small unit of search information can easily be specified. Accordingly, the small unit of search information can easily be used at the time of executing a search for moving image contents.

In accordance with a still further aspect of the present invention, a search information managing method includes, for forming and managing small units of search information from search information having a tree structure corresponding to moving image contents, the record position information extracting step, the structural information extracting step and the unit search information forming step.

In the record position information extracting step, for each of one or a plurality of search information elements given by one or a plurality of leaves of the tree structure or given by one or a plurality of sub-trees consisting of an arbitrary set of a node and leaves or nodes of lower levels linked to the node of the tree structure, representing elements of the same type included in the search information, record position information representing the position where the search information element is recorded is extracted. In the structural information extracting step, structural information corresponding to the one or a plurality of search information elements is extracted from the search information. In the unit search information forming step, a small unit of search information is formed by arranging, in a prescribed format, the record position information corresponding to the one or a plurality of search information elements extracted by the record position information extracting step and the structural information extracted by the structural information extracting step.

Therefore, the one or a plurality of search information elements represented by the small unit of search information can be specified by the record position information arranged in the small unit of search information, and the search information elements can easily be used at the time of executing a search for the moving image contents. When a small unit of search information is requested for searching for moving image contents and the small unit of search information is transmitted to the source of request, it is possible for the source of request to specify the desired search information element by the record position information in the received small unit of search information without the necessity of transmitting the search information element itself. Further, by transmitting only the desired search information element at every request to the source of request, a highly efficient search becomes possible.

According to a still further aspect of the present invention, the search information managing method includes, for managing search information having a tree structure corresponding to moving image contents divided into small units of search information, first and second search information dividing step and the division selecting step.

In the first search information dividing step, the search information is divided into structural search information representing the structure of the moving image contents, semantic search information representing characteristics in semantic context of the moving image contents, and signal search information representing physical characteristics of signals of the moving image contents, from the divided structural search information, information corresponding to the semantic search information or signal search information, respectively, is extracted, and small units of search information are formed by adding the extracted structural information to the semantic search information and the signal search information obtained by the division, respectively.

In the second search information dividing step, the search information is divided along time section based on the tree structure, and from divided search information, small units of search information are formed.

In the division selecting step, whether the search information is to be divided by the first search information dividing step or the second search information dividing step is selected, in accordance with the desired manner of search.

Therefore, when the search information having the tree structure corresponding to the moving image contents is to be divided into small units of search information and managed, it is possible to selectively form, in accordance with the desired manner of search, a small unit of search information in accordance with one format or a small unit of search in accordance with the other format. The one format is associated with the type of the search information. Specifically, according to this format, the search information is divided into structural search information, semantic search information and signal search information, from the structural search information obtained by the division, information corresponding to the semantic search information and the signal search information are extracted respectively, and the extracted structural information is added to the semantic search information and the signal search information respectively. In the other format, the search information is divided along time section, and the unit information consists of the thus divided search information. As it is possible to select whether the small unit of search information is to be formed in accordance with the one format or the other format, the optimal small unit of search information can be selected dependent on the manner of search, such as an on-line search or an off-line search. Thus, a highly efficient search is realized.

In accordance with a still further aspect of the present invention, the search information managing method is for managing search information having a tree structure corresponding to moving image contents divided into small units of search information, and it includes the first forming step, the second forming step and the selecting step. In the first forming step, one or a plurality of search information elements given by one or a plurality of sub-trees are separated and drawn out from the search information, structural information corresponding to the drawn out one or a plurality of search information elements is extracted from the search information, and by arranging the drawn out one or a plurality of search information elements and the extracted corresponding structural information in a prescribed format, a small units of search information is formed. The aforementioned sub-tree consists of leaves in the tree structure or an arbitrary set of a node of the tree structure and leaves or nodes of the lower levels linked to the nodes, representing the elements of the same type included in the search information.

In the second forming step, the search information is divided along time section based on the tree structure, and from each of the divided search information, a small unit of search information is formed.

In the selecting step, whether the small unit of search information is to be formed by the first forming step or the second forming step is selected, in accordance with the desired manner of search.

Therefore, when the search information having the tree structure corresponding to the moving image contents is to be divided into small units of search information and managed, it is possible to form, in accordance with the desired manner of search, a small unit in accordance with one format the other format. The one format is associated with the type of the search information. Specifically, according to this format, one or a plurality of search information elements given by the above described one or a plurality of sub-trees are drawn out, structural information corresponding to the drawn out one or a plurality of search information elements is extracted, and the one or a plurality of search information elements and the corresponding structural information are arranged in a prescribed format. In the other format, the search information is divided along time section, and the unit information is formed by the thus divided search information. As it is possible to select whether the small unit of search information is to be formed in accordance with the one format or the other format, the optimal small unit of search information can be selected dependent on the manner of search, such as an on-line search or an off-line search. Thus, a highly efficient search is realized.

In accordance with a still further aspect of the present invention, the search apparatus includes, for conducting a search based on a small unit of search information obtained by dividing search information having a tree structure corresponding to moving image contents, a holding unit holding small units of search information and a search executing unit executing a search for the moving image contents using the small units of search information. The small unit of search information is at least one of small units of search information formed of semantic search information representing characteristics in semantic context of the moving image contents, or signal search information representing physical characteristics of signals of the moving image contents, and includes structural information obtained from the structural search information representing the structure of the moving image contents.

The small unit of search information is formed including at least one of semantic search information representing characteristics in semantic context of the moving image contents and signal search information representing physical characteristics of signals of the moving image contents, and the structural information of the moving image contents. Therefore, it is possible to conduct a search using a small unit of search information corresponding to desired information of semantic search information or signal search information. Thus, an efficient search becomes possible.

In accordance with a still further aspect of the present invention, the search apparatus includes, for conducting a search based on a small unit of search information obtained by dividing search information having a tree structure corresponding to moving image contents, a holding unit holding small units of search information and a search executing unit executing a search for the moving image contents using the small units of search information. The small unit of search information is formed by arranging, in a prescribed format, one or a plurality of search information elements given by one or a plurality of leaves of the tree structure or given by one or a plurality of sub-trees consisting of an arbitrary set of a node and leaves or nodes of lower levels linked to the node of the tree structure, representing elements of the same type included in the search information and separated and drawn out from the search information as well as structural information corresponding to the one or a plurality of search information elements extracted from the search information.

Therefore, a search is conducted using a small unit of search information formed by drawing out one or a plurality of search information elements given by one or a plurality of leaves of the tree structure or given by one or a plurality of sub-trees consisting of an arbitrary set of a node and leaves or nodes of lower levels linked to the node of the tree structure, representing elements of the same type included in the search information, extracting structural information corresponding to the drawn out one or a plurality of search information elements and arranging the one or a plurality of search information elements and the corresponding structural information in a prescribed format. Accordingly, each of the search information elements included in the small unit of search information can easily be specified, and a highly efficient search is possible.

In accordance with a still further aspect of the present invention, the search apparatus for executing a search based on small units of search information formed from search information having a tree structure corresponding to moving image contents includes a first holding unit holding small units of search information, a second holding unit holding one or a plurality of search information elements obtained by using the small units of search information, and a search executing unit executing a search for the moving image contents, using the small units of search information and the one or a plurality of search information elements. The small unit of search information is formed, for each of the one or a plurality of search information elements given by one or a plurality of leaves of the tree structure or given by one or a plurality of sub-trees consisting of an arbitrary set of a node and leaves or nodes of lower levels linked to the node of the tree structure, representing elements of the same type included in the search information, by arranging, in a prescribed format, record position information representing the position where the corresponding search information element is recorded and the corresponding structural information extracted from the search information.

Therefore, a search is conducted using small units of search information formed by arranging, in a prescribed format, record position information and the structural information for each of the one or a plurality of search information elements given by one or a plurality of leaves of the tree structure or given by one or a plurality of sub-trees consisting of an arbitrary set of a node and leaves or nodes of lower levels linked to the node of the tree structure, representing elements of the same type included in the search information. Accordingly, the search information element designated by the record position information in the small unit of search information can easily be specified. Further, by obtaining only the minimum necessary search information element as needed in accordance with the situation, a highly efficient search is possible.

In accordance with a still further aspect of the present invention, the search information managing apparatus includes a position calculating unit and a recovering unit.

In order to recover, from a small unit of search information obtained by dividing search information having a tree structure corresponding to moving image contents, part of the search information having the tree structure, the position calculating unit calculates a position in the tree structure that corresponds to semantic search information or signal search information included in the small unit of search information from the structural information included in the small unit of search information.

The recovering unit recovers, from the semantic search information or the signal search information included in the small unit of search information and the calculated position of the tree structure, part of the search information having the tree structure.

The small unit of search information is at least one of small units of search information formed of semantic search information representing characteristics in semantic context of the moving image contents and signal search information representing physical characteristics of signals of the moving image contents, and includes structural information obtained from structural search information representing the structure of the moving image contents.

Therefore, the small unit of search information is formed including at least one of semantic search information representing characteristics in semantic context of the moving image contents and signal search information representing physical characteristics of signals of the moving image contents, and structural information of the moving image contents. Therefore, by recovering a part of the search information having the tree structure utilizing the small unit of search information corresponding to the desired semantic search information or signal search information, it becomes possible to manage only a small amount of search information in the form of a tree.

In accordance with a still further aspect of the present invention, the search information managing apparatus includes a position calculating unit and a recovering unit.

In order to recover, from a small unit of search information obtained by dividing search information having a tree structure corresponding to moving image contents, part of the search information having the tree structure, the position calculating unit calculates a position in the tree structure that corresponds to one or a plurality of search information elements included in the small unit of search information, from the structural information included in the small unit of search information.

The recovering unit recovers, from the one or a plurality of search information elements included in the small unit of search information and the calculated position of the tree structure, part of the search information having the tree structure.

The small unit of search information is formed by arranging, in a prescribed format, one or a plurality of search information elements given by one or a plurality of sub-trees and structural information corresponding to the one or a plurality of search information elements extracted from the search information. Here, the sub-tree consists of leaves of the structure or an arbitrary set of a node and leaves or nodes of lower levels linked to the node of the tree structure, representing elements of the same type included in the search information.

Therefore, the small unit of search information is formed by arranging, in a prescribed format, one or a plurality of search information elements given by one or a plurality of sub-trees and the corresponding structural information.

Therefore, by recovering a part of the search information having the tree structure utilizing the small unit of search information corresponding to the desired search information element, it becomes possible to manage only a small amount of information in the form of a tree structure.

The search information managing apparatus in accordance with a still further aspect of the present invention includes a position calculating unit, a search information element obtaining unit and a recovering unit.

Position calculating unit calculates, based on the small unit of search information formed from the search information having the tree structure corresponding to the moving image contents, a position or positions of one or a plurality of search information elements indicated by the record position information included in the small unit of search information from the structural information included in the small unit of search information, in order to recover part of the search information having the tree structure.

Search information obtaining unit obtains, based on the record position information included in the small unit of search information, the corresponding one or a plurality of search information elements. The recovering unit recovers part of the search information having the tree structure, from the obtained one or a plurality of search information elements and the obtained position in the tree structure.

The small unit of search information is formed by arranging, for each of the one or a plurality of search information elements given by one or a plurality of sub-trees, record position information indicating the position where the search information element is recorded, and the corresponding structural information extracted from the search information. Here, the sub-tree consists of leaves of the structure or an arbitrary set of a node and leaves or nodes of lower levels linked to the node of the tree structure, representing elements of the same type included in the search information.

Therefore, the small unit of search information is formed by arranging, in a prescribed format, record position information of respective ones of the one or a plurality of search information elements given by the above described one or a plurality of sub-trees included in the search information and the corresponding structural information. Therefore, by recovering a part of the search information having the tree structure utilizing the small unit of search information including the record position information corresponding to the desired search information element, it becomes possible to manage only a small amount of information in the form of a tree structure.

BRIEF DESCRIPTION OF THE DRAWINGS

FIGS. 13A to 13D represent conventional division of the search information having the tree structure.

BEST MODES FOR CARRYING OUT THE INVENTION

Embodiments of the present invention will be described with reference to the drawings.

First Embodiment

Figure 1:
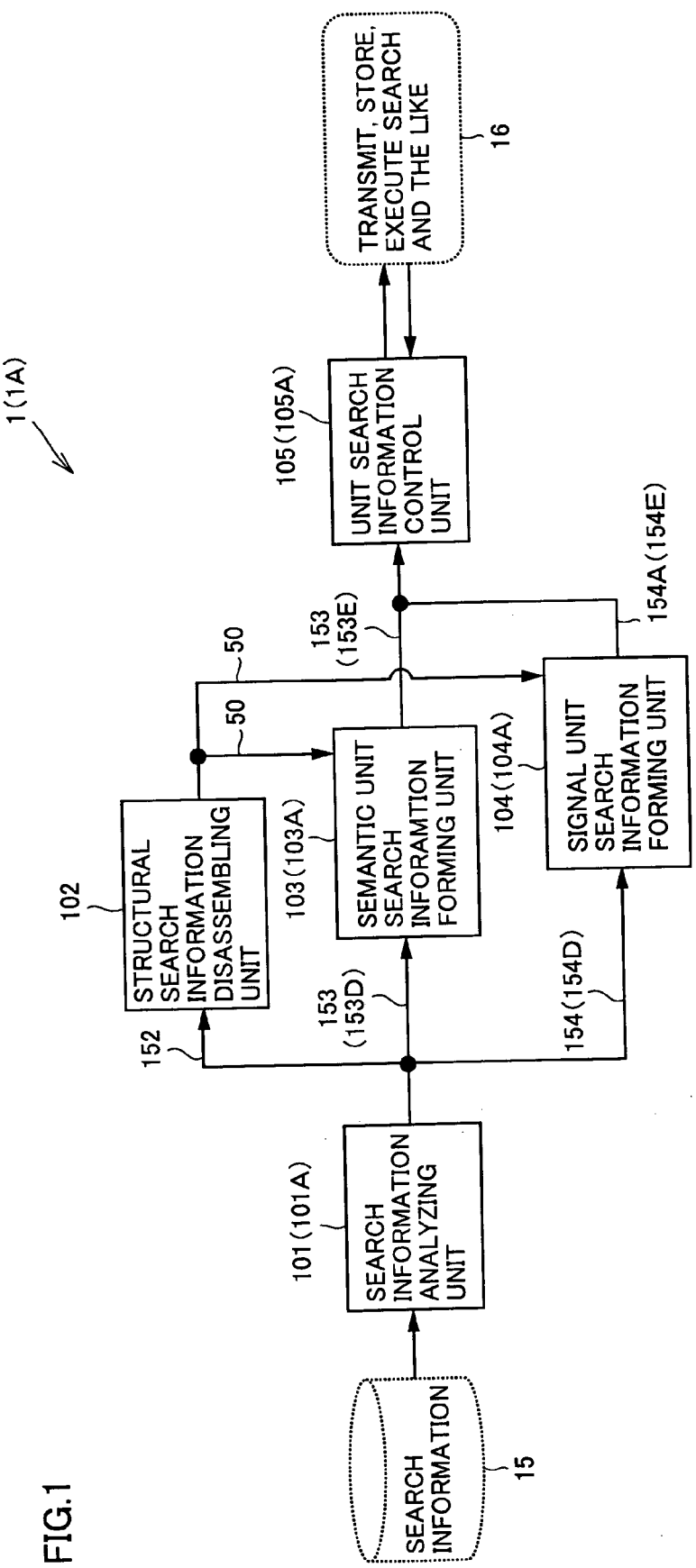
FIG. 1 is a schematic diagram of a search information managing apparatus in accordance with the first and second embodiments of the present invention.

FIG. 1 shows a functional configuration of a search information managing apparatus 1 in accordance with the present embodiment. Referring to FIG. 1, search information managing apparatus 1 includes a search information analyzing unit 101, a structural search information disassembling unit 102, a semantic unit search information forming unit 103, a signal unit search information forming unit 104 and a unit search information control unit 105. Search information analyzing unit 101 receives, as an input, search information 15 having a tree structure corresponding to moving image contents, separates the input search information 15 into one or more search information elements 152 of the structural search information, one or more search information elements 153 of the semantic search information and one or more search information elements 154 of the signal search information, and selectively outputs the same.

Structural search information disassembling unit 102 receives one or more structural search information elements 152 output from search information analyzing unit 101, draws out minimum necessary structural information 50 from the received search information elements 152, and outputs the same to semantic unit search information forming unit 103 and signal unit search information forming unit 104. More specifically, structural search information disassembling unit 102 receives as inputs the applied one or more structural search information elements, disassembles the same, and from the contents of disassembled one or more structural search information elements, extracts, as minimum structural information 50, information corresponding to at least one of the semantic search information and the signal search information.

Figure 2:
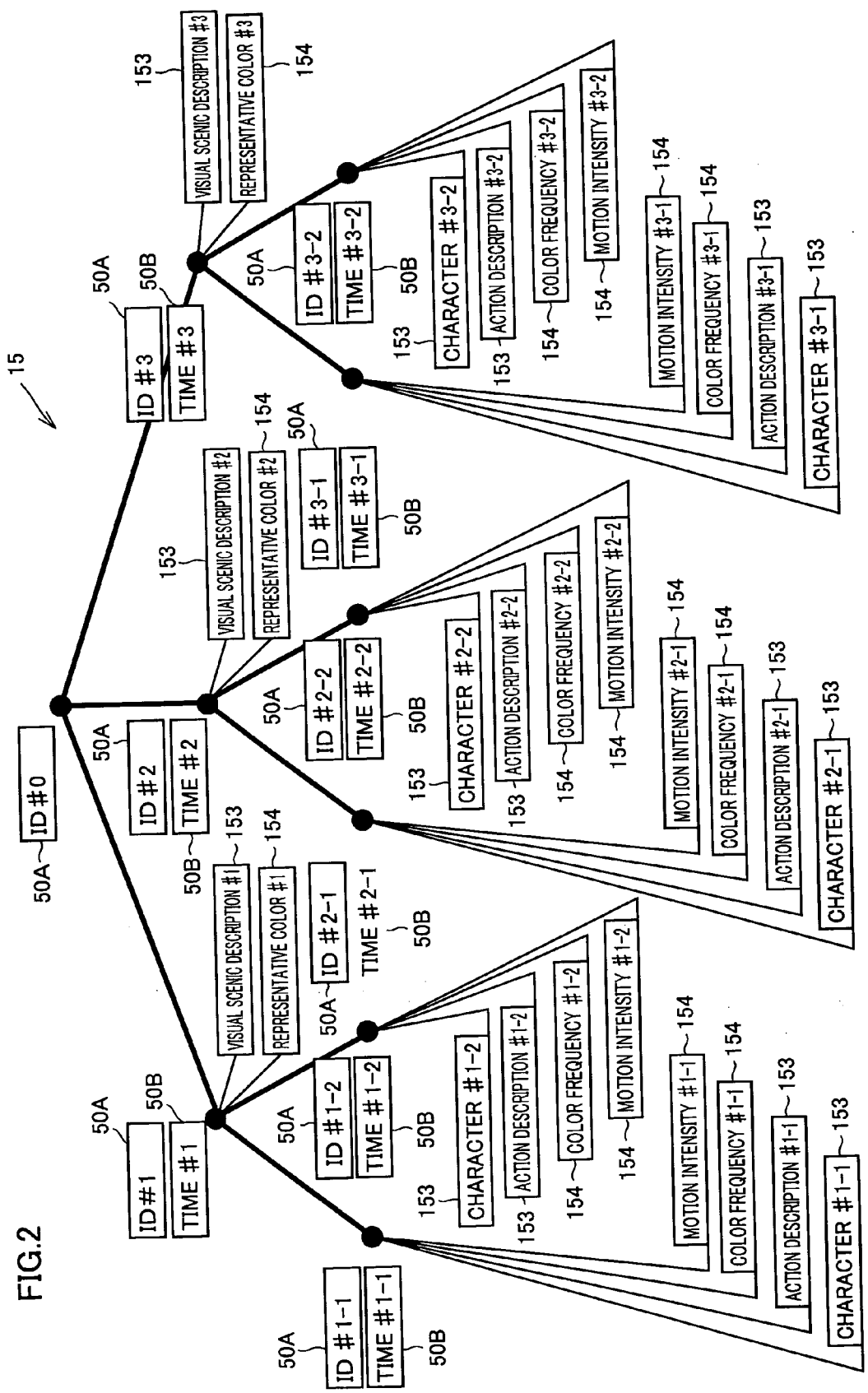
FIG. 2 represents search information having a tree structure used in the first embodiment of the present invention.

FIG. 2 represents the search information having the tree structure used in the present embodiment. For simplicity of description, it is assumed that in the present search information 15, structural search information element 152 consists only of node ID information and time information of each scene and each shot, semantic search information element 153 consists only of visual scenic description information of each scene and character information and action description information of each shot, and signal search information element 154 consists only of representative color information of each scene and color frequency information and motion intensity information of each shot. Actual search information 15 additionally has various search information elements, and the present invention can similarly be applied to the various search information elements.

Structural search information disassembling unit 102 selects and draws out, as the minimum necessary structural information 50, either one of or both of structuring information (such as node ID) 50A and structural attribute information (such as time information) 50B. Which information is to be selected as structural information 50 depends on the manner of search that will be executed using of the resulting unit search information.

When structuring information 50A is selected, a search can be executed focusing on the hierarchical structure of the moving image contents or relation between each of the scenes or shots of the entire moving image contents. When the structural attribute information 50B is selected, a search can be executed in which a portion in the moving image contents that corresponds to the result of search can immediately be drawn out and displayed.

The structuring information 50A will be described in grater detail. Structuring information 50A represents information for forming the tree structure of the search information, that enables recovery of the original tree structure. The node ID information as the structuring information 50A of the present embodiment represents the linkage relation between the nodes (for example, "#1-1" and "#1-2" represent children nodes ND that are linked to "#1"). Using this information, the original tree structure can be recovered. Therefore, in a search requiring recovery of the original tree structure, the structuring information 50A is selected as the structural information.

Though ID information is not added to a leaf RF that represents each search information element in FIG. 2, the ID information may be added to each leaf RF. Other structuring information 50A may include a code allocated to each "branch" (the bar portion connecting the root R, node ND and leaf RF with each other) of the tree structure, so that by the codes of branches starting from the root R to a certain node ND or leaf RF, the position information of the node ND or the leaf RF can be obtained.

Structural information 50 extracted from structural search information element 152 may have redundant information omitted and the information may be compressed as needed, in order to provide minimum necessary information. By way of example, when node ID information as the structuring information 50A is used as the structural information 50, "#1-2" following "#1-1" has the node ID "#1" of the upper node ND common to the preceding one, and therefore, only the information "2" may be applied as the structural information 50 with the common "#1" omitted. When it is known that "1" is always followed by "2" (always incremented by 1), difference information representing "increment by 1" may be generated and used as structural information 50. The method of extracting the minimum necessary information is not limited to the above.

Semantic unit search information forming unit 103 receives as inputs semantic search information element 153 applied from search information analyzing unit 101 and the minimum necessary structural information 50 applied from structural search information disassembling unit 102, arranges the input information and forms unit search information 153A of semantic search information.

Figure 3:
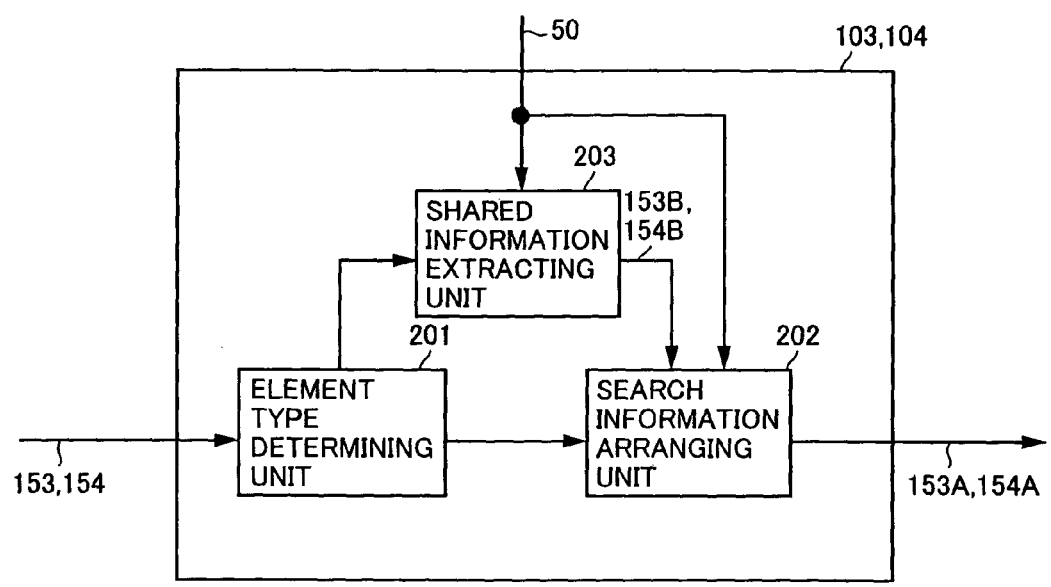
FIG. 3 shows an internal configuration of the semantic unit search information forming unit and the signal unit search information forming unit in the search information managing apparatus in accordance with the first embodiment of the present invention.

FIG. 3 shows an internal configuration of semantic unit information forming unit 103 of FIG. 1. Referring to FIG. 3, semantic unit search information forming unit 103 includes an element type determining unit 201, a search information arranging unit 202 and a shared information extracting unit 203. Here, search information elements 153 (leaves RF) of one same type connected to nodes ND (or root R) of the same type in the tree structure of search information 15 are arranged, type by type of the search information elements 153, while maintaining relation of appearance order thereof in the tree structure, to form unit search information 153A. Specifically, element type determining unit 201 receives search information elements 153 of semantic search information applied from search information analyzing unit 101, and while determining the types (representing different types such as character information, action description information and the like) of the received search information elements, outputs each of the received search information elements 153 together with the result of determination, to search information arranging unit 202 and to shared information extracting unit 203. Search information arranging unit 202 arranges search information elements 153 type by type based on the information applied from element type determining unit 201, together with the corresponding minimum necessary structural information 50 drawn out by structural search information disassembling unit 102, to form unit search information 153A. At this time, information 153B (for example, information representing the type of search information element 153) shared by search information elements 153 included in respective ones of unit of search information 153A formed type by type by search information arranging unit 202 is extracted by shared information extracting unit 203 and applied to search information arranging unit 202. Search information arranging unit 202 places shared information 153B applied from shared information extracting unit 203 at the head of the formed unit search information 153A. Other than this example, information representing format or data length of semantic search information elements 153 may be used as the shared information 153B, and information used as the shared information 153B is not specifically limited.

From the structural information 50 drawn out from structural search information disassembling unit 102 or from the original structural search information element 152, information that can be shared, such as the level information where search information elements are connected to nodes of the same level, may be extracted by shared information extracting unit 203 and may be placed at the head of the unit search information, as the. appended shared information 153B.

Further, based on the level information of nodes ND obtained from structural information 50 or structural search information element 152, it is possible to distinguish semantic search information elements 153 of the same type but added to nodes ND of different levels from each other, and to separately form unit search information 153A consisting only of semantic search information elements 153 added to the same level.

As to the position of placing the shared information 153B, it is not limited to the head of unit search information 153A, and it may be placed at the tail of unit search information 153A or within unit search information 153A. Alternatively, shared information 153B may be recorded at a different record position together with information representing correspondence between unit search information 153A and the shared information 153B. Shared information 153B and the process by shared information extracting unit 203 may be omitted.

Figure 4:
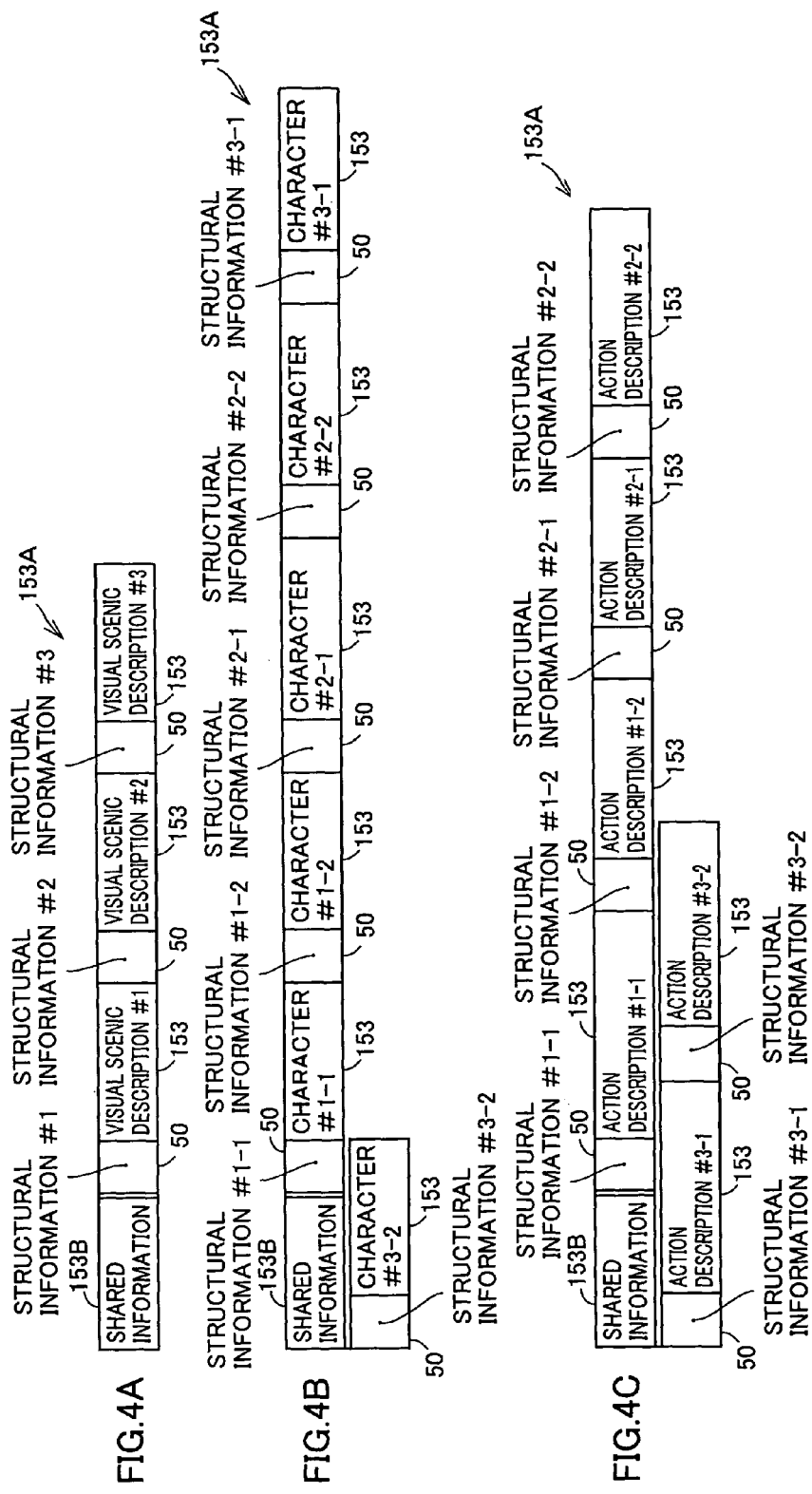
FIGS. 4A to 4C represent unit search information of the semantic search information obtained by division in accordance with the first embodiment of the present invention.

FIGS. 4A to 4C represent unit search information 153A formed by drawing out visual scenic information, character information and action description information as semantic search information elements 153 from search information 15 having the tree structure shown in FIG. 2, and by arranging the drawn out semantic search information elements 153 and corresponding structural information 50 together with shared information 153B.

In unit search information 153A shown in FIGS. 4A to 4C, semantic search information elements 153 and corresponding structural information 50 are paired and arranged alternately as an example. The format of arrangement of semantic search information elements 153 and the corresponding structural information 50 is not limited thereto. For example, structural information 50 may be arranged collectively at first, and corresponding semantic search information elements 153 may be continuously arranged thereafter, or the order may be reversed. There is no limit in the format of arrangement, except that the relation of appearance order in the tree structure is maintained.

When shared information 153B of semantic search information elements 153 is to be extracted from structural information 50 drawn out from structural search information disassembling unit 102 or from the structural search information 152, difference information representing a difference from shared information 153B (information that cannot be shared) may be used as structural information 50 corresponding to each of semantic search information elements 153.

When node ID information of structuring information 50A is used as structural information 50, the unit search information 153A may be formed by the following procedure. By way of example, for a node ND having the node ID "#1-1" and a node ND having the node ID "#1-2", information "#1" that corresponds to the node ID of a shared upper node ND may be drawn out as shared information 153B and that one information may be added to unit search information 153A, while difference information "1" and "2" of node ID, with the shared information "#1" omitted, may be arranged as structural information 50 corresponding to respective semantic search information elements 153.

Alternatively, taking one level as a reference, level information of the nodes ND thereof may be added as shared information, and information representing a difference from the reference level (information representing a level higher by one or lower by one) may be added to each semantic search information element 153. At that time, addition of difference information may be omitted for semantic search information element 153 that has no difference. Other than these, a flag indicating whether there is a semantic search information element 153 or not corresponding to a certain scene or shot, or information representing importance when semantic search information element 153 is used, may be used as the information to be added to each semantic search information element 153. The information to be added to each semantic search information element 153 is not specifically limited.

Signal unit search information forming unit 104 receives one or more search information elements 154 of the signal search information from search information analyzing unit 101, receives the minimum necessary structural information 50 applied form structural search information disassembling unit 102, arranges the received search information elements 154 and structural information 50 to form one or more units of search information 154A of the signal search information, and outputs the same. The internal configuration of signal unit search information forming unit 104 is similar to that shown in FIG. 3. Here, signal search information elements 154 (leaves RF) of one same type connected to nodes ND (or root R) of the same type in the tree structure of search information 15 are arranged, type by type of the signal search information elements 154, while maintaining relation of appearance order thereof in the tree structure, to form one or more units of search information 154A. Specifically, element type determining unit 201 shown in FIG. 3 receives signal search information elements 154, determines the types (representing different types of information such as color frequency information and motion intensity information) of respective ones of the received signal search information elements 154, and outputs the result of determination and signal search information elements 154 to search information arranging unit 202 and to shared information extracting unit 203. Based on the applied information, search information arranging unit 202 arranges the signal search information elements 154 type by type, together with the corresponding minimum necessary structural information 50 applied from structural search information disassembling unit 102, to form and output one or more units of search information 154A. At this time, based on the applied information, shared information extracting unit 203 extracts information 154B (for example, information representing the type of signal search information element 154) shared by signal search information elements 154 included in respective ones of unit search information 154A formed by search information arranging unit 202 from signal search information elements 154, and applies the same to search information arranging unit 202. Search information arranging unit 202 places the shared information 154B applied from shared information extracting unit 203 at the head of unit search information 154A. Other than this example, information representing data format, sample number of color frequency information or data length of signal search information elements 154 may be used as the shared information 154B, and information used as the shared information 154B is not specifically limited.

From the structural information 50 drawn out from structural search information disassembling unit 102 or from the original structural search information element 152, information that can be shared, such as the level information where search information elements are connected to nodes of the same level, may be extracted by shared information extracting unit 203 and may be placed at the head of the signal unit search information 154A, as the appended shared information 154B.

Further, based on the level information of nodes ND obtained from the structural information 50 or structural search information 152, it is possible to distinguish signal search information elements 154 of the same type but added to nodes ND of different levels from each other, and to separately form unit search information 154A consisting only of signal search information elements 154 added to the same level.

As to the position of placing the shared information 154B, it is not limited, and it may be placed at the tail of unit search information 154A or within unit search information 154A. Alternatively, shared information 154B may be recorded at a different record position together with information representing correspondence between unit search information 154A and the shared information 154B. Shared information 154B and the process by shared information extracting unit 203 may be omitted.

Figure 5:
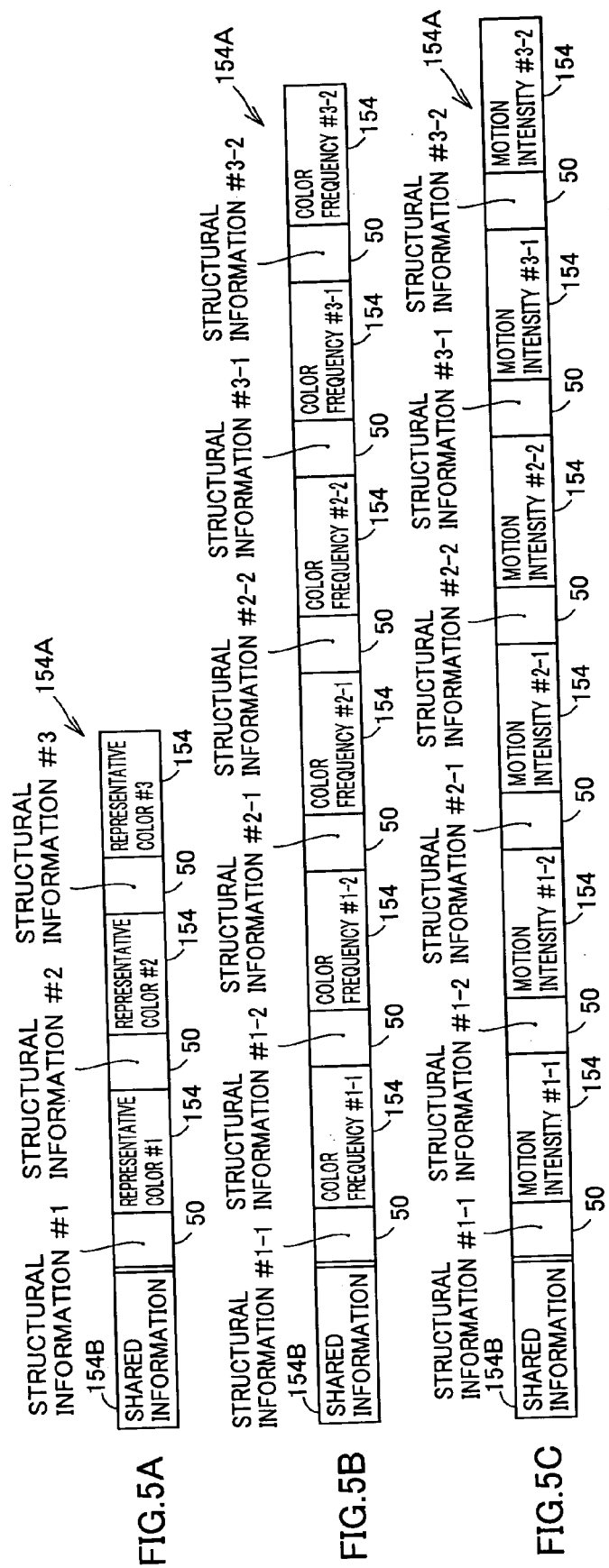
FIGS. 5A to 5C represent unit search information of the signal search information obtained by division in accordance with the first embodiment of the present invention.

Unit search information 154A shown in FIGS. 5A to 5C is formed by drawing out, from search information 15 having the tree structure of FIG. 2, the representative color information, color frequency information and motion intensity information as the signal search information elements 154, and arranging the drawn out signal search information elements and the corresponding structural information 50 together with the shared information 154B.

In unit search information 154A shown in FIGS. 5A to 5C, signal search information elements 154 and corresponding structural information 50 are paired and arranged alternately as an example. The format of arrangement of signal search information elements 154 and the corresponding structural information 50 is not limited thereto. For example, structural information 50 may be arranged collectively at first, and corresponding signal search information elements 154 may be continuously arranged thereafter, or the order may be reversed. There is no limit in the format of arrangement, except that the relation of appearance order in the tree structure is maintained.

When shared information 154B corresponding to signal search information elements 154 is to be extracted from structural information 50 drawn out by structural search information disassembling unit 102 or from the structural search information 152, difference information representing a difference from shared information 154B (information that cannot be shared) may be used as structural information 50 corresponding to each of signal search information elements 154. When node ID information of structuring information 50A is used as structural information 50, the unit search information 154A may be formed by the following procedure. By way of example, for a node having the node ID "#1-1" and a node ND having the node ID "#1-2", information "#1" that corresponds to the node ID of a shared upper node ND may be drawn out as shared information 154B and that one information may be added to unit search information 154A, while difference information "1" and "2" of node ID, with the shared information "#1" omitted, may be arranged as structural information 50 corresponding to respective signal search information elements 154.

Alternatively, taking one level as a reference, level information of the nodes ND thereof may be added to unit search information 154A as shared information 154B, and information representing a difference from the reference level (information representing a level higher by one or lower by one) may be added to each signal search information element 154. At that time, addition of difference information may be omitted for signal search information element 154 that has no difference.

Other than these, a flag indicating whether there is a signal search information element 154 or not corresponding to a certain scene or shot, or information representing importance when signal search information element 154 is used, may be used as the information to be added to each signal search information element 154. The information to be added to each signal search information element 154 is not specifically limited.

Units of search information 153A and 154A of the semantic search information and signal search information including structural information 50 generated by semantic unit search information forming unit 103 and signal unit search information forming unit 104 are applied to unit search information control unit 105.

Unit search information control unit 105 is connected to a processing unit 16 outside the search information managing apparatus 1. Processing unit 16 corresponds to a transmitting unit for transmitting information, a storing unit recording and storing information on some medium, or a portion for executing an information search process. When processing unit 16 is a transmitting unit, search information managing apparatus 1 selects one or more units of search information meeting the request from the transmitting unit from units of search information 153A and 154A, and applies the same to processing unit 16 (transmitting unit).

Figure 6:
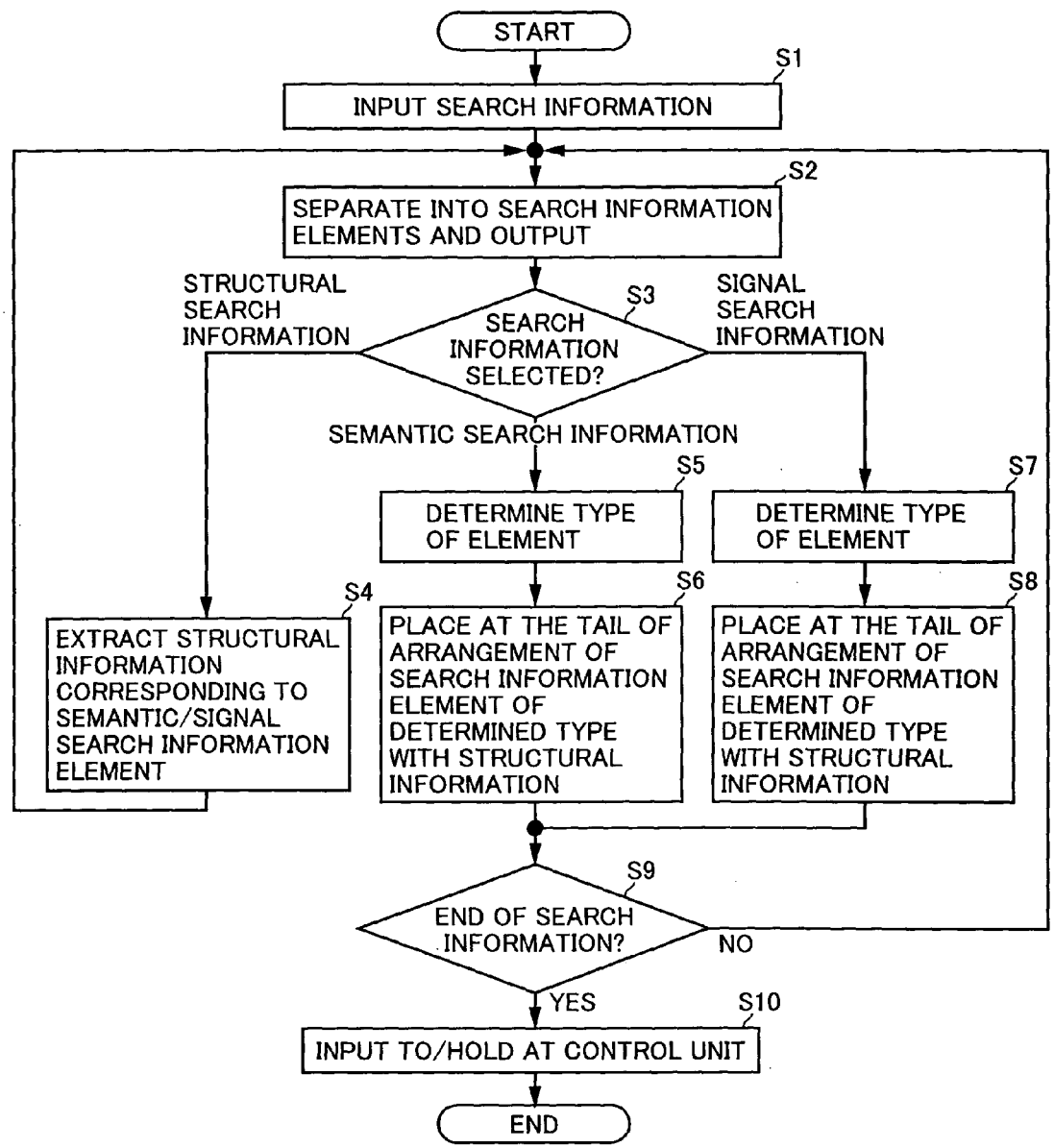
FIG. 6 is a flow chart representing the search information managing method in accordance with the first embodiment of the present invention.

Referring to the flow chart of FIG. 6, the search information managing method in accordance with the present embodiment will be described. First, search information 15 to be divided is designated, and search information analyzing unit 101 receives as an input the designated search information 15 (step S1: in the following, a step will be simply denoted by S), separates the input search information 15 into search information elements, and successively outputs structural search information element 152, semantic search information element 153 and signal search information element 154 obtained by the separation (S2). Whether the successively obtained search information elements correspond to the structural search information, semantic search information or signal search information is determined, and based on the result of determination, the search information elements are applied to any of structural search information disassembling unit 102, semantic unit search information forming unit 103 and signal unit search information forming unit 104 (S3).

When the search information element represents structural search information, structural information 50 that is necessary to form units of search information 153A and 154A of the semantic search information and signal search information is extracted from the structural search information element 152 (S4), and separation and reading of the search information elements are repeated (S2).

When the search information element represents semantic search information, the type thereof is determined (S5), and the semantic search information element 153 is placed at the tail of the arrangement of semantic search information elements 153 of the same type that have been arranged by that time, together with the already extracted structural information 50 (S6).

When the search information element represents signal search information, the type thereof is determined (S7), and the signal search information element 154 is placed at the tail of the arrangement of signal search information elements 154 of the same type that have been arranged by that time, together with the already extracted structural information 50 (S8).

At the end of each of the processes for forming unit search information 153A and 154A of steps S4 to S8, whether it is an end of search information 15 or not is determined (S9). When it is determined to be the end, the formed units of search information 153A and 154A are respectively applied to unit search information control unit 105, and held therein (S 10). If it is not the end, separation and reading of search information elements are again repeated (S2).

By performing the process in accordance with the above described configuration and flow chart, it becomes possible to transfer or use minimum information necessary to conduct a search for moving image contents, and a highly efficient search can be executed.

Figure 7:
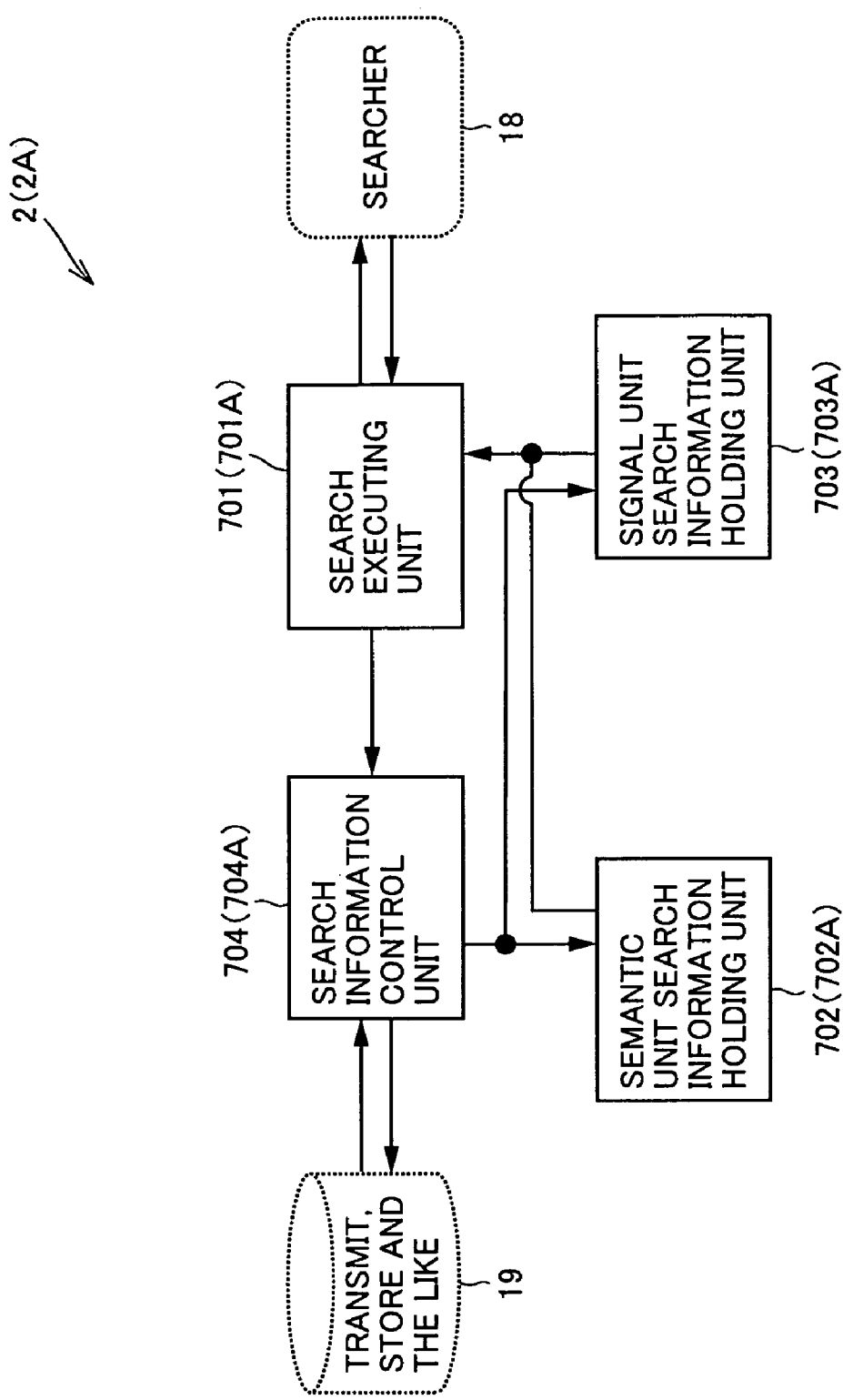
FIG. 7 is a schematic diagram of the search apparatus in accordance with the first and second embodiments of the present invention.

FIG. 7 represents a schematic configuration of a search apparatus 2 in accordance with the present embodiment. As shown in FIG. 7, the search apparatus 2 operated by a searcher 18 includes a search executing unit 701 for executing a search for moving image contents, a semantic unit search information holding unit 702, a signal unit search information holding unit 703 and a search information control unit 704. Search executing unit 701 selects, in accordance with a search request input by the searcher 18, an arbitrary combination of one or more of semantic unit search information 153A held (recorded) in semantic unit search information holding unit 702 and signal unit search information 154A held (recorded) in signal unit search information holding unit 703, obtains unit search information of the selected combination, and using the obtained unit search information, executes a search for the moving image contents. When the unit search information to be selected is not held in any of corresponding unit search information holding units 702 and 703, search executing unit 701 issues a request for the corresponding unit search information to search information control unit 704.

Search information control unit 704 is connected to a transmitting unit or to a storing unit 19. The transmitting unit or storing unit 19 has a transmitting portion for transmitting a plurality of types of unit search information, or a storing portion for recording and storing a plurality of types of unit search information on a prescribed medium in advance. When a request for unit search information is input from search executing unit 701, search information control unit 704 obtains, in response to the request, the unit search information corresponding to the request from transmitting unit or storing unit 19 by transmission or reading, and stores the obtained unit search information to corresponding one of the unit search information holding units 702 and 703. Search executing unit 701 executes a search using the unit search information obtained in this manner.

By way of example, when a method of search based on color characteristic of moving image contents is considered the most desirable, the searcher 18 requests color frequency information. Alternatively, the searcher 18 may simply input a broad request such as "information related to color desired," and in response to the request, search executing unit 701 may determine and appropriately "issue a request for color frequency information." To meet the request, unit search information 154A consisting of the color frequency information and the minimum necessary structural information 50 is obtained from transmitting unit or storing unit 19.

Based on the unit search information 154A formed by the structural information and the color frequency information obtained in this manner, search executing unit 701 executes a search. In this manner, the amount of search information transmitted at the time of a search can be reduced as compared with the conventional manner. The procedure of search described here is merely an example and not limiting.

The period how long the obtained unit search information is held is not specifically limited. When the client terminal that executes a search is one having a small storage capacity such as a portable information terminal, the obtained unit search information may be discarded every time a search is conducted, and when the terminal has sufficient storage capacity, the information may be continuously held while searches are conducted. Alternatively, such a management may be possible in that the unit search information may be held for a prescribed time period, and the unit search information may be discarded if it is not accessed in that period.

Though a search is executed based on the formed unit search information in the search apparatus in accordance with the present embodiment, the search information of the original tree structure (part thereof) may be recovered from the obtained unit search information, and based on the search information of the recovered tree structure, a search may be executed, dependent on the manner or search.

As each of the units of search information formed by the search information managing apparatus in accordance with the present invention includes the structural information, it is possible to recover the original tree structure by using the structural information (structuring information). Specifically, by finding the position information in the tree structure from the structural information included in the unit search information, obtaining the corresponding search information element indicated by the corresponding record position information in the unit search information, and connecting the same as a leaf RF to the position of the tree structure indicated by the found position information, the tree structure is recovered. The recovery from the unit search information to the tree structure can be used not only for the search but also for transmission of the search information to other person through a narrow network, by dividing the tree into small pieces, transmitting each of the divided pieces to the destination and recovering the tree at the receiving side to be managed as the search information.

Each unit search information (153A, 154A) shown in FIGS. 4A to 4C and 5A to 5C is formed by arranging corresponding search information elements (153, 154) respectively in order, and each of the search information elements may be coupled, or each of the search information elements may be held in an independent format. In the latter case, it is possible to output only the necessary number of search information elements (153, 154) as partial unit search information (153A, 154A).

In FIGS. 4A to 4C and 5A to 5C, all the search information elements (153, 154) of the same type included in search information 15 shown in FIG. 2 are used to form units of search information (153A, 154A). The units of search information, however, may be formed by using only the part of search information elements. The part may include a subset (subset as compared with the whole) of search information elements neighboring successively in time, or a set of sub samples picked-up at a prescribed interval.

Each of the search information 15 and search information elements (152, 153, 154) described in the present embodiment is an example only, and the search information and search information elements are not limited thereto. The tree structure of search information 15 may have a larger number of levels, or it may consist of two levels (only the root R and one or more nodes ND of the first level). The tree structure may have any shape. The present embodiment is applicable regardless of the types of search information elements.

In the present embodiment, though the search information elements collected as the unit search information is described as individual information corresponding to each "leaf" of the tree structure such as the color frequency information, it is not limiting. For example, "color information" collectively including a plurality of pieces of information related to "color" such as color frequency information and representative color information may be considered as one element, and the unit search information may be formed regarding the one element as the search information element.

Here, each piece of color frequency information or representative color information corresponds to "leaf RF" of the tree structure, and "color information" corresponds to a "node ND" having the leaves RF at the lower level. Specifically, in the present embodiment, respective search information elements forming the unit search information are not limited to detailed pieces of search information corresponding to the "leaves RF" of the tree structure, and they may be an arbitrary set of detailed pieces of search information below a "node ND" that can be regarded as a group.

Here, an arbitrary set of leaves RF or nodes ND linked at a lower level to a certain node ND (with each of the nodes ND further linked to leaves RF or nodes ND of lower level) forms a tree with the starting node considered as a root R, and this tree is referred to as a "partial tree", or "sub-tree", of the original tree. In other words, the present embodiment may be applied with the portion of the search information that corresponds to the "partial tree" of the tree structure representing the search information considered as the search information element.

In the search information managing apparatus 1 and the search information managing method in accordance with the present embodiment, all the search information elements (153, 154) included in the search information 15 having the tree structure are drawn out in the similar manner, all the units of search information (153A, 154A) corresponding to the drawn out search information elements respectively are formed in parallel, and all the thus formed units of search information are managed for transmission, for storage or for a search. It is also possible, however, to draw out only the search information elements of a specific type and form only a unit of search information corresponding to the drawn out specific type of search information element.

By way of example, only the color frequency information may be drawn out among the search information elements, and only the unit search information corresponding to the drawn out color frequency information may be formed and managed by unit search information control unit 105. In that case, search information analyzing unit 101, structural search information disassembling unit 102, signal unit search information forming unit 104 and unit search information control unit 105 only function. Therefore, semantic unit search information forming unit 103 may be omitted.

The same applies to search apparatus 2 in accordance with the present embodiment. When a search is executed based particularly on the color frequency information among the signal search information, and the semantic search information is deemed unnecessary, only the search executing unit 701, signal unit search information holding unit 703 and search information control unit 704 of search apparatus 2 shown in FIG. 7 function. Therefore, semantic unit search information holding unit 702 may be omitted.

When part of the semantic search information elements 153 or signal search information elements 154 is drawn out and corresponding unit search information (153A or 154A) is formed using the drawn out part of the search information elements (153 or 154), the remaining search information 15 from which the search information elements (153 or 154) are drawn out may be utilized while maintaining the tree structure.

Specifically, here, the tree representing the original search information 15 is divided into a partial tree as a part of the original tree and one or a plurality of units of search information 153A consisting of a plurality of semantic search information elements 153 or one or a plurality of units of search information 154A consisting of a plurality of signal search information elements 154. In the present invention, dependent on which search information element is selected to be drawn out, original search information 15 having the tree structure can be divided in various shapes.

In the present embodiment, structural information of the search information, that is, position information of a node ND or a leaf RF in the tree structure, and type information of the search information element, that is, information representing that the element is action description information (semantic search information element 153) or color frequency information (signal search information element 154) are described as independent pieces of information. When the search information elements forming the search information are determined in advance and the tree structure is fixed, the position of each search information element in the tree structure can be specified, and therefore, the type of the search information element can be represented simply by the structural information. In other words, the structural information and the type information are equivalent. Here, the process of adding type information as shared information 153B and 154B corresponding to search information elements 153 and 154 described with reference to the present embodiment, for example, can be realized by adding the corresponding shared structural information.

Second Embodiment

In the first embodiment, various search information elements, that is, structural search information element 152, semantic search information element 153 and signal search information element 154 are separated and drawn out from search information 15 having a tree structure, structural information 50 is extracted from the drawn out structural search information element 152, and by arranging the semantic search information elements 153 of the same type themselves or the signal search information elements 154 of the same type themselves together with the extracted structural information 50 in order, semantic unit search information 153A or signal unit search information 154A is formed.

In contrast, in the present embodiment, where semantic search information element 153 and signal search information element 154 are separated in advance from the search information 15 and recorded independently, not the semantic search information element 153 and signal search information element 154 themselves but information representing record positions of these is obtained, and the obtained record position information is arranged in order together with the structural information, to form semantic unit search information 153E and signal unit search information 154E.

By this configuration, similar effects as the first embodiment can be obtained. In the following, a search information managing apparatus 1A and a search apparatus 2A in accordance with the present embodiment will be described, focusing on the difference from the corresponding elements of the first embodiment. Therefore, details of the present embodiment are not described here, and detailed descriptions related to the search information managing apparatus 1 and method as well as to the search apparatus 2 in accordance with the first embodiment are similarly applicable.

The schematic configuration of the search information managing apparatus 1A in accordance with the present embodiment is shown, similar to the first embodiment, in FIG. 1. The function of search information managing apparatus 1A is slightly different from that of the first embodiment, as will be described below.

Referring to FIG. 1, search information managing apparatus 1A includes search information analyzing unit 101A, structural search information disassembling unit 102, semantic unit search information forming unit 103A, signal unit search information forming unit 104A and unit search information control unit 105A. Search information analyzing unit 101A analyzes search information 15 having the tree structure corresponding to moving image contents, outputs structural search information element 152 included in search information 15 to structural search information disassembling unit 102, specifies semantic search information element 153 and signal search information element 154, respectively, and extracts, for respective ones of the specified search information elements 153 and 154, record position information 153D and 154D. Record position information 153D and 154D represent record positions where corresponding semantic search information element 153 and signal search information element 154 are recorded, respectively. Thereafter, together with information necessary to form units of search information 153E and 154E, for example, information of the types of search information elements and level information of the tree structure, the record position information 153D and 154D of search information elements 153 and 154 respectively are output to corresponding semantic unit search information forming unit 103A and signal unit search information forming unit 104A, respectively.

Record position information 153D and 154D may include but not limited to physical position information such as a sector position of a recording medium or a bit position in a bit sequence on which the search information 15 is recorded in advance, or logical information such as a file name containing the data, a channel for data transmission or a packet.

Semantic search information element 153 and signal search information element 154 indicated by record position information 153D and 154D are independently read and utilized as needed at a time of a search for moving image contents, for example. Therefore, it may be convenient that the semantic search information element 153 and the signal search information element 154 are separated in advance and recorded independently. In many practical servers, structural search information element 152, semantic search information element 153 and signal search information element 154 of search information 15 having the tree structure are separated and recorded in some way or other. Therefore, record position of such divided semantic search information element 153 and signal search information element 154 can directly be utilized as record position information 153D and 154D.

When the search information 15 having the tree structure is recorded as it is and not separated in advance into search information elements 152, 153 and 154, search information analyzing unit 101A separates search information elements 152, 153 and 154, records search information elements 153 and 154, and generates record position information 153D and 154D thereof.

Structural search information disassembling unit 102 receives as an input the structural search information element 152 from search information analyzing unit 101A, draws out minimum necessary structural information 50 from the input search information element 152, and applies the same to semantic unit search information forming unit 103A and signal unit search information forming unit 104A.

Semantic unit search information forming unit 103A receives as inputs the minimum necessary structural information 50 from structural search information disassembling unit 102 and record position information 153D of each of semantic search information elements 153 of the same type from search information analyzing unit 101A, and arranges the input information type by type of the semantic search information elements 153, while maintaining the relation of appearance order in the tree structure of the corresponding semantic search information elements, to form the unit search information 153E of the semantic search information consisting of the record position information 153D of the semantic search information elements 153.

Signal unit search information forming unit 104A receives as inputs the minimum necessary structural information 50 from structural search information disassembling unit 102 and record position information 154D of each of signal search information elements 154 of the same type from search information analyzing unit 101A, and arranges the input information type by type of the signal search information elements 154, while maintaining the relation of appearance order in the tree structure of the corresponding signal search information elements, to form the unit search information 154E of the signal search information consisting of the record position information 154D of the signal search information elements 154.

Figure 8:
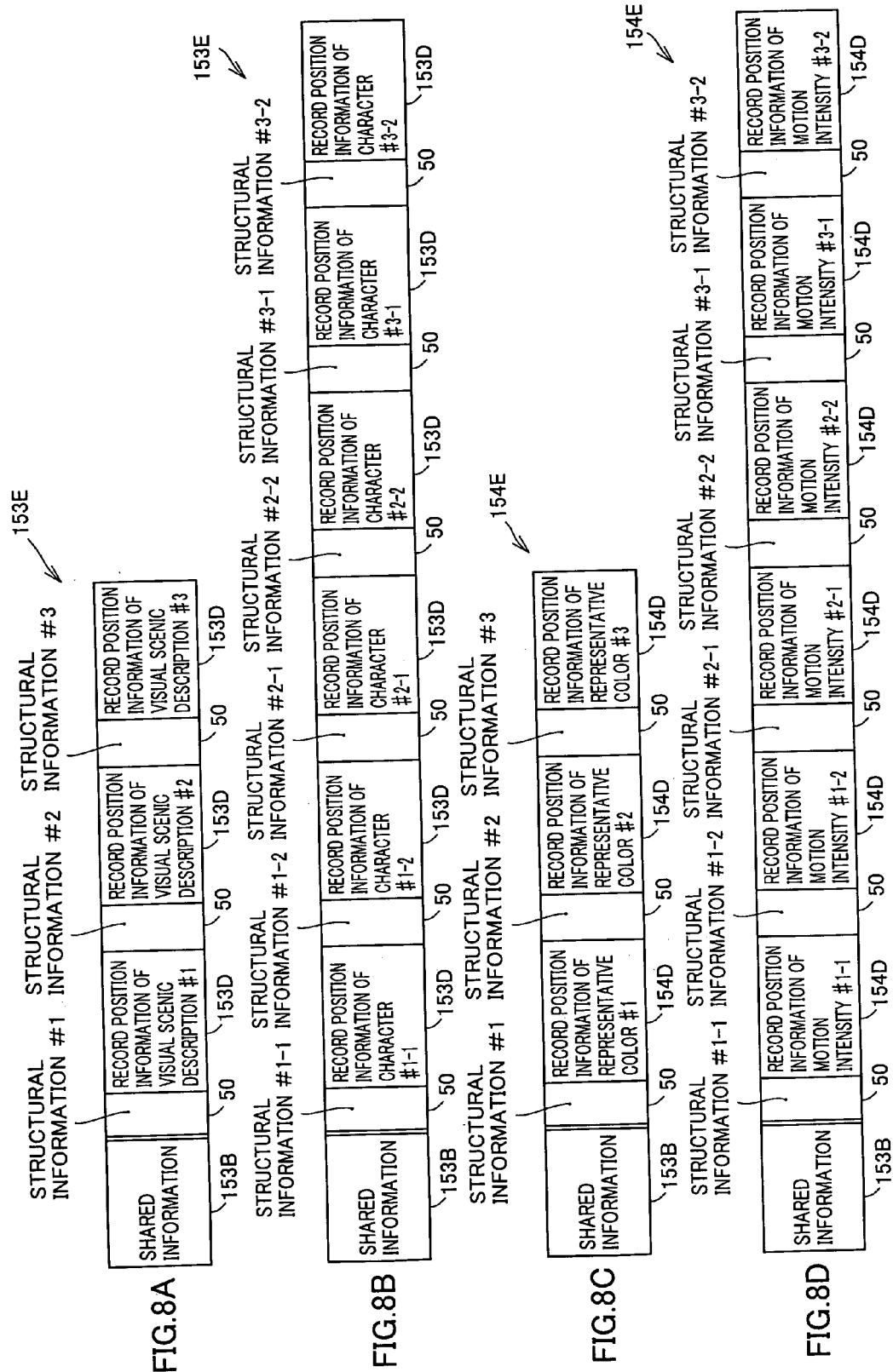
FIGS. 8A to 8D represent unit search information of semantic search information and signal search information, respectively, formed in accordance with the second embodiment of the present invention.

FIGS. 8A to 8D represent, as examples, semantic unit search information 153E and signal unit search information 154E in accordance with the present invention. In FIGS. 8A and 8B, visual scenic description information of respective scenes and character information of respective shots are shown as examples of semantic search information elements 153, and in FIGS. 8C and 8D, representative color information of respective scenes and motion intensity information of respective shots are shown as examples of signal search information elements 154.

As is apparent from the comparison between FIGS. 8A to 8D, 4A to 4C and 5A to 5C, the unit search information (153E and 154E) formed in accordance with the present embodiment is the same as the unit search information (153A and 154A) formed in accordance with the first embodiment, except that the elements forming the unit search information are changed from the search information elements (153,154) themselves to record position information (153D, 154D).

Therefore, the types, method of extraction and the like of the shared information to be handled similar to those described in the first embodiment are also applied to the present embodiment. Thus, effects similar to those obtained by the first embodiment are also obtained in the present embodiment.

Unit search information control unit 105A is connected to a processing unit 16, and, by way of example, when processing unit 16 is a transmitting unit, corresponding unit search information is transmitted, in response to a request from a destination of transmission. Unit search information control unit 105A in accordance with the present embodiment receives a request based on record position information 153D or 154D of the semantic or signal search information element 153 or 154 included in already transmitted unit search information, draws out the semantic or signal search information element 153 or 154 that is indicated by the record position information 153D or 154D corresponding to the request, and transmits the same to the source of request.

Though not described in the present embodiment, for various pieces of structural information 50 drawn out from structural search information element 152 to be used, not the data themselves of structural information 50 but information representing record position may be extracted similar to that for the above described semantic search information element 153 and signal search information element 154, and the unit search information may be formed using the extracted record position information.

In this case, from the record position information of structural information 50 and the record position information 153D of semantic search information element 153, a semantic unit search information is formed, and from the record position information of structural information 50 and the record position information 154D of the signal search information element 154, a signal unit search information is formed.

The schematic configuration of the search apparatus 2A in accordance with the present embodiment is shown, similar to the first embodiment, in FIG. 7. The function of search apparatus 2A is slightly different from that of the first embodiment, as will be described below.

Search apparatus 2A in accordance with the present embodiment includes a search executing unit 701A, a semantic unit search information holding unit 702A, a signal unit search information holding unit 703A, and a search information control unit 704A. Semantic unit search information holding unit 702A and signal unit search information holding unit 703A hold units of search information 153E and 154E, respectively, and in addition they have the function of temporarily holding for every one search execution or continuously holding for a period while searches are executed, each of search information elements 153 and 154 obtained based on respective record position information 153D and 154D included in the already obtained units of search information 153E and 154E, respectively.

Search executing unit 701A selects one or an arbitrary combination of a plurality of various search information elements held in semantic unit search information holding unit 702A and signal unit search information holding unit 703A, obtains search information elements in accordance with the selected combination, and executes a search for the moving image contents using the obtained one or more search information elements.

When the search information elements are held only temporarily in unit search information holding units 702A and 703A, that is, when the elements are discarded at every execution of a search, search executing unit 701A starts a search not from a request for search information elements but from a request for unit search information to unit search information holding units 702A and 703A, as will be described in the following. For simplicity of description, here, a search will be described as an example, which starts with a request for semantic unit search information 153E.

The operation is the same when signal unit search information 154E is requested or when both semantic unit search information 153E and signal unit search information 154E are requested.

When the selected semantic search information element 153 is not held in the corresponding semantic unit search information holding unit 702A, search executing unit 70 1A requests corresponding unit search information 153E from semantic unit search information holding unit 702A.

When the requested unit search information 153E can be obtained from corresponding semantic unit search information holding unit 702A, search executing unit 701A applies to search information control unit 704A, the obtained unit search information 153E together with a request for a search information element. Based on the record position information 153D included in the applied unit search information 153E, search information control unit 704A obtains the corresponding semantic search information element 153 from the transmitting unit or storing unit 19, and stores the obtained semantic search information element 153 in corresponding semantic unit search information holding unit 702A. Search executing unit 701A executes a search using semantic search information element 153 obtained in this manner.

When the requested unit search information 153E is not held in the corresponding semantic unit search information holding unit 702A and hence cannot be obtained, search executing unit 701A first issues a request for the unit search information 153E to search information control unit 704A. Receiving the request as an input, search information control unit 704A obtains the corresponding unit search information 153E in response to the input request from the transmitting unit or storing unit 19, and stores the obtained unit search information 153E in the corresponding semantic unit search information holding unit 702A. Thereafter, search executing unit 701A applies, together with a request for a search information element, the obtained unit search information 153E to search information control unit 704A. Based on the record position information 153D included in the applied unit search information 153E, search information control unit 704A obtains the corresponding semantic search information element 153 from the transmitting unit or storing unit 19, and stores the obtained semantic search information element 153 in the corresponding unit search information holding unit 702A. Search executing unit 701A executes a search for moving. image contents (data of moving image contents prepared by the transmitting unit or storing unit 19), using the semantic search information element 153 obtained in this manner.

As will be understood from the foregoing, search apparatus 2A in accordance with the present embodiment differs from search apparatus 2 in accordance with the first embodiment in that, as regards the manner of obtaining the search information, two steps are taken. Namely, the record position information of the search information element is obtained from the unit search information, and from the obtained record position information, the corresponding search information element is obtained. Except for this point, the processes are the same. Therefore, similar effects as obtained in the first embodiment can also be obtained in the present embodiment.

According to the present embodiment that uses unit search information consisting only of the record position information, only a small amount of signals have to be recorded, as compared with the unit search information consisting of various search information elements themselves. Therefore, in such a situation that a searcher conducts a search using a client terminal such as a portable information terminal having a small storage capacity, the search method is effective, in which only the unit search information in accordance with the present embodiment is continuously held in the client terminal and only the necessary search information elements are obtained from a server apparatus (corresponding to the transmitting unit or storing unit 19 of FIG. 7) using the unit search information at the time of executing a search. The sever apparatus has data of moving image contents and data of search information 15 that are separated into search information elements in advance recorded therein, and the server has a function of reading and outputting to the source of request the data of the moving image contents or the data of search information 15 in response to a request from the outside.

Therefore, it is possible to know, in a simple manner, what search information exists in the server apparatus from the unit search information, and efficiency of executing a search can be improved as only the necessary search information is transmitted.

In the foregoing, the timing at which the unit search information is obtained from the transmitting unit or storing unit 19 has been described as dependent on the request of the searcher. The description is not limiting, and, by way of example, various units of search information may only be automatically obtained by a client terminal at the start of a search. There is no limit on the timing of obtaining or discarding the unit search information.

In the foregoing, holding time of the search information element obtained based on the record position information in the unit search information has been described as temporal, that is, the element is discarded every time a search is executed, or continuous, that is, the element is held for the period of execution of searches. The description, however, is not limiting, and such a management may be possible in that the element is held for a prescribed time period and discarded if there is no access to the element in the prescribed time period. There is no limit as to the holding time of the search information element.

Though a search is executed based on the formed unit search information in the search apparatus in accordance with the present embodiment, the search information of the original tree structure (part thereof) may be recovered from the obtained unit search information, and based on the search information of the recovered tree structure, a search may be executed, dependent on the manner or search. As each of the units of search information formed by the search information managing apparatus in accordance with the present invention includes the structural information, it is possible to recover the original tree structure by using the structural information (structuring information). Specifically, by finding the position information in the tree structure from the structural information included in the unit search information, obtaining the corresponding search information element indicated by the corresponding record position information in the unit search information, and connecting the same as a leaf RF to the position of the tree structure indicated by the found position information, the tree structure is recovered. The recovery from the unit search information to the tree structure can be used not only for the search but also for transmission of the search information to other person through a narrow network, by dividing the tree into small pieces, transmitting each of the divided pieces to the destination (other person) and recovering the tree at the receiving side (other person) to be managed as the search information.

Third Embodiment

Figure 9:
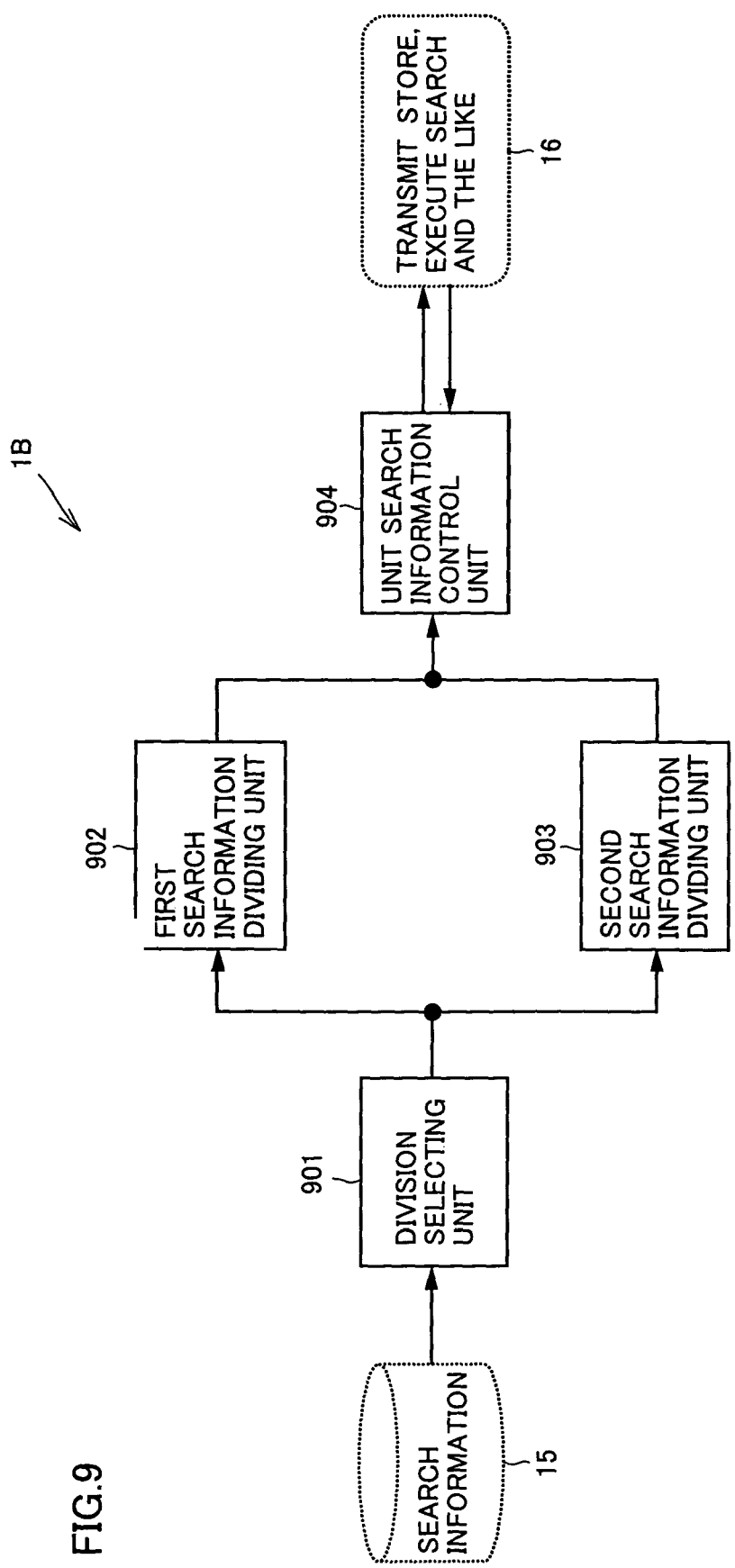
FIG. 9 is a schematic diagram of the search information managing apparatus in accordance with the third embodiment of the present invention.
Figure 10:
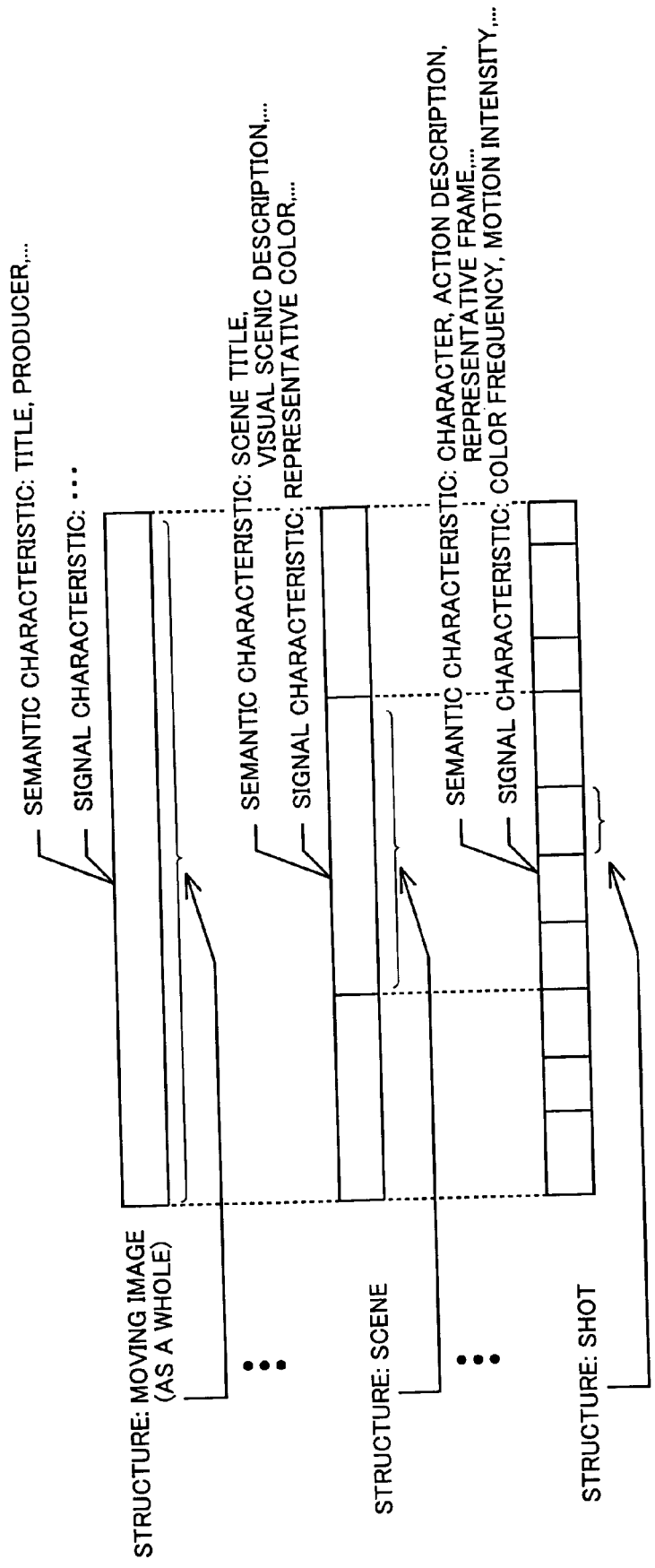
FIG. 10 illustrates a general structure of moving image contents.
Figure 11:
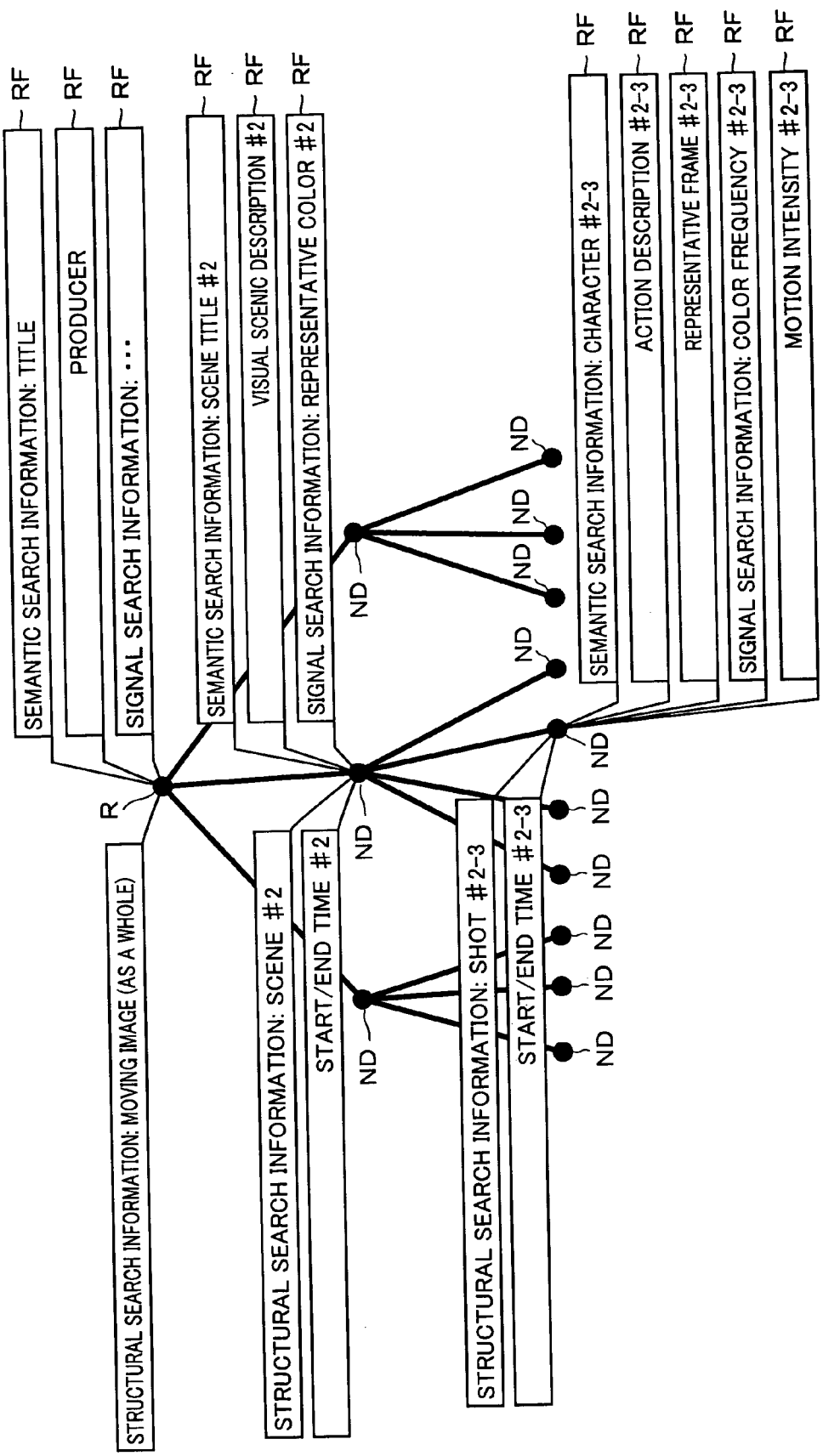
FIG. 11 represents, in a tree structure, search information added to the moving image contents of FIG. 10.
Figure 12:
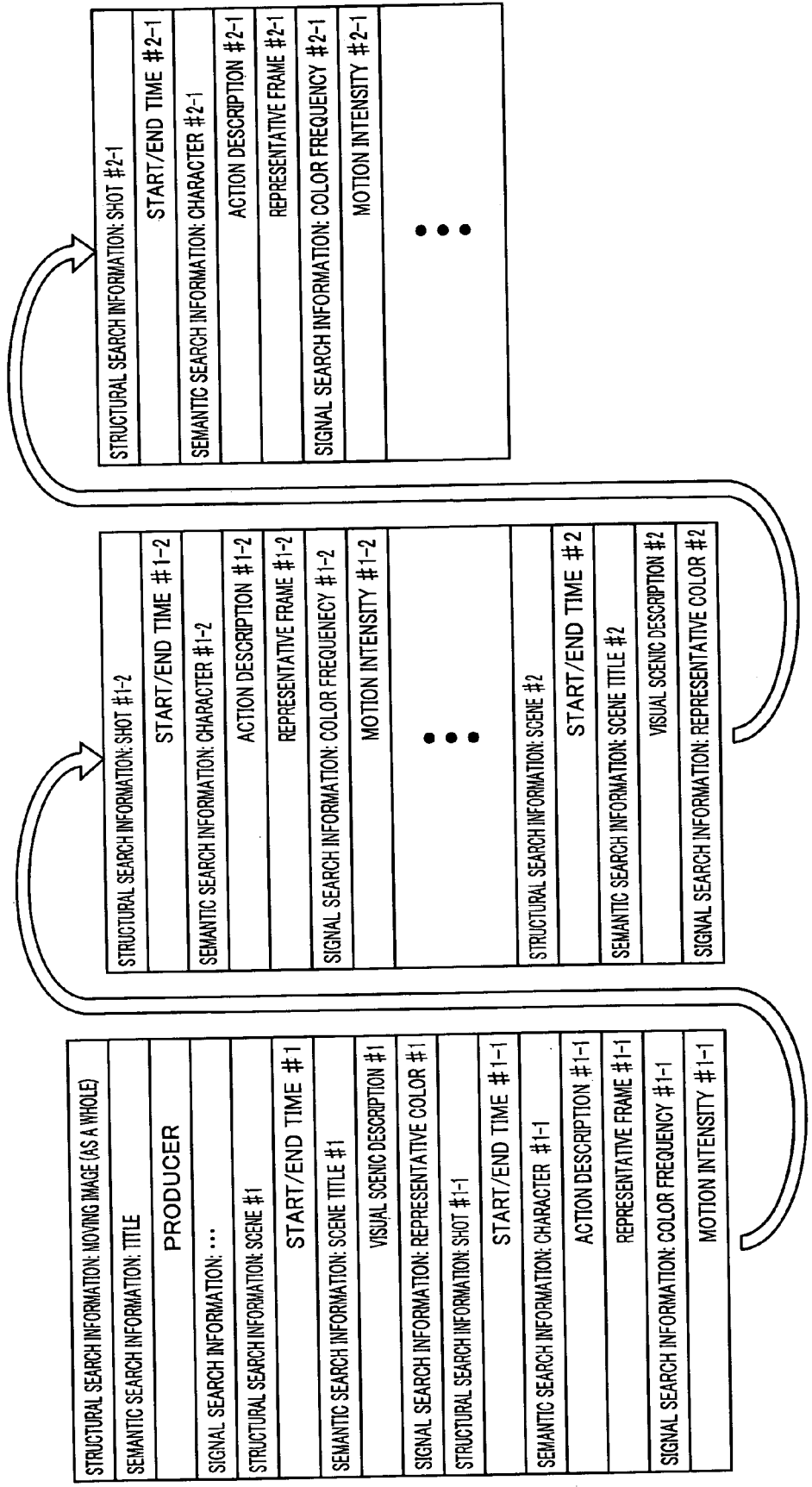
FIG. 12 illustrates the method of recording the search information of the moving image contents shown in FIG. 10.
Figure 14:
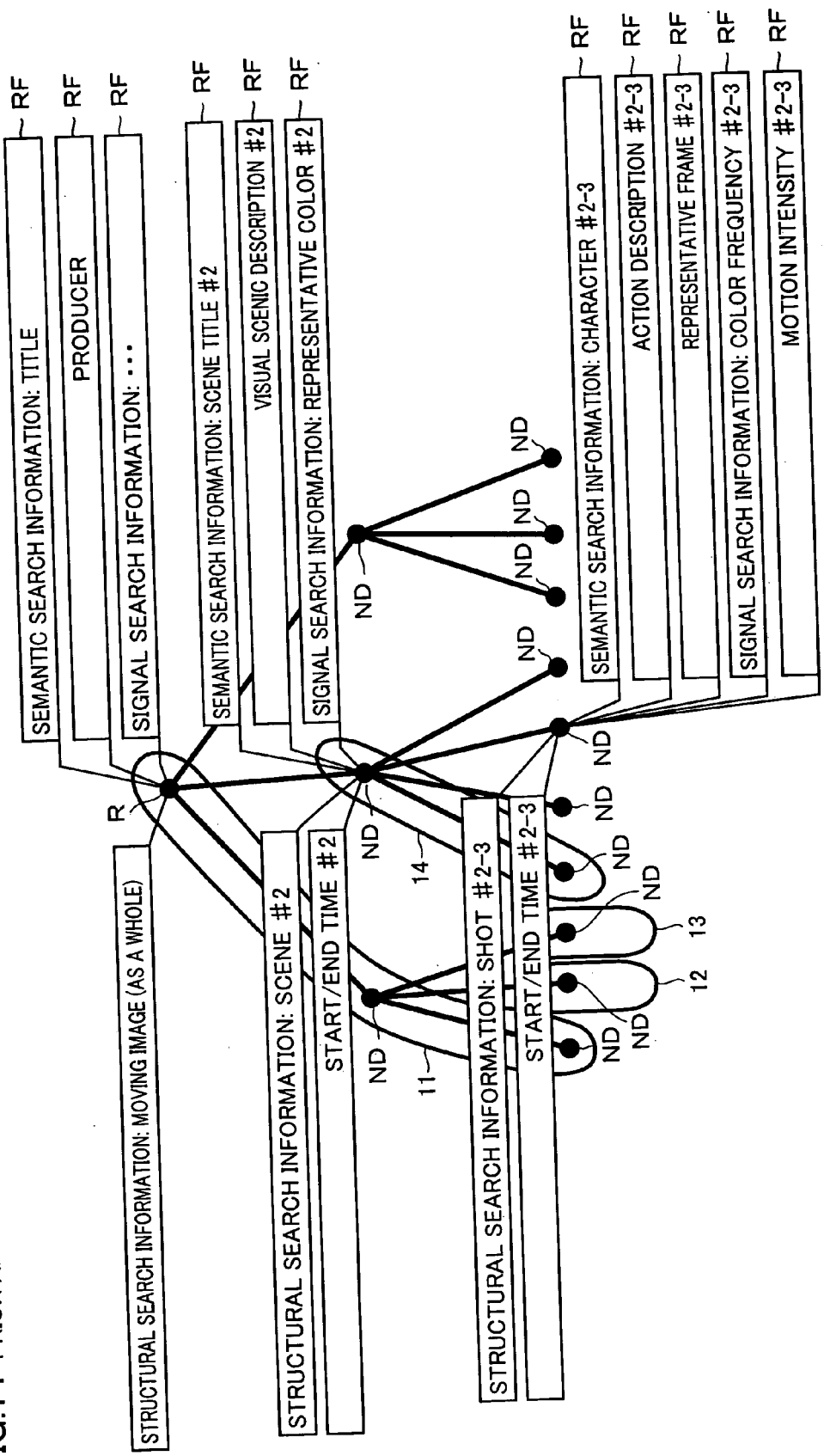
FIG. 14 represents a conventional method of managing search information having the tree structure.

FIG. 9 shows a schematic configuration of a search information managing apparatus 1B in accordance with the present embodiment. Search information managing apparatus 1B includes a division selecting unit 901, first search information dividing unit 902, second search information dividing unit 903 and a unit search information control unit 904. Division selecting unit 901 designates manner of search, that is, whether the desired manner of search for the moving image contents is an on-line search or an off-line search. In accordance with the designated manner of executing a search, the method of division of search information 15, that is, the form of the unit search information obtained by the division, is selected. Search information 15 is, for example, the search information 15 having the tree structure shown in FIG. 2.

When an off-line search is designated and the unit search information associated with the types of search information elements is selected as the method of dividing search information 15, division selecting unit 901 instructs first search information dividing unit 902 to execute division of search information 15. When an on-line search is designated and unit search information consisting of time sections is selected as the method of dividing search information 15, division selecting unit 901 instructs second search information dividing unit 903 to execute division of search information 15. In a special example in which an off-line search and an on-line search are conducted simultaneously, division selecting unit 901 instructs both the first and second search information dividing units 902 and 903 to execute division of search information 15 (formation of unit search information).

First search information dividing unit 902 receives as an input the search information 15, executes division of search information 15 associated with the types of search information elements as described in the first (second) embodiment, and forms and outputs units of search information 153A (153E) and 154A (154E) associated with the types of search information such as shown in FIGS. 4A to 4C and 5A to 5C (8A to 8D).

Second search information dividing unit 903 receives as an input the search information 15, executes division using time section as a unit as shown in FIGS. 13A to 13D or FIG. 14, and forms and outputs unit search information along time section.

Unit search information control unit 904 is connected to processing unit 16, selects one or both of the unit search information associated with the types of search information elements formed by first search information dividing unit 902 and the unit search information along the time section formed by second search information dividing unit 903 in response to a request from processing unit 16, and outputs the selected information to the source of request.

As the division selecting unit 901 is provided, appropriate control of search information (formation of unit search information) in accordance with the manner of executing a search for the moving image contents becomes possible.

The invention claimed is:

1. A search information managing apparatus managing search information, stored on a tangible machine-readable medium, having a tree structure corresponding to moving image contents, wherein:
   said search information contains a plurality of search information elements of a same type attached to a same hierarchical level of the tree structure, wherein each of said plurality of search information elements is given by a leaf of the tree structure or given by a sub-tree of the tree structure consisting of a node and an arbitrary set of leaves or nodes of lower levels linked to the node, and contains structural information corresponding to said plurality of search information elements;
   said apparatus comprising:
      a structural information compressor that removes redundant information from said structural information corresponding to said plurality of search information elements whereby to reduce a total quantity of said structural information; and
      a unit search information formation section that forms a unit of search information by arranging said plurality of search information elements only of the same type and corresponding said structural information compressed by said structural information compressor in accordance with a prescribed format, wherein
      said structural information compressor separates said structural information into shared structural information including type information shared by said plurality of search information elements or shared position information of said tree structure, and un-shared structural information other than said shared structural information; and
      said unit search information formation section forms a unit of search information by arranging, in addition to said arrangement of said plurality of search information elements, said shared structural information and said un-shared structural information.

2. The search information managing apparatus according to claim 1, wherein
   said plurality of search information elements formed into said unit of search information by said unit search information formation section correspond to signal search information representing physical characteristics of signals of said moving image contents.

3. The search information managing apparatus according to claim 1, wherein
   said plurality of search information elements formed into said unit of search information by said unit search information formation section correspond to semantic search information representing characteristics in semantic context of said moving image contents.

4. The search information managing apparatus according to claim 1, wherein
   said prescribed format represents an arrangement of said plurality of search information elements formed into said unit of search information by said unit search information formation section in accordance with an order of appearance of said plurality of search information elements in said tree structure.

5. A search information managing apparatus managing a unit of search information stored on a tangible machine-readable medium, said unit of search information formed from search information having a tree structure corresponding to moving image contents, wherein said search information contains a plurality of search information elements of a same type attached to a same hierarchical level of the tree structure, wherein each of said plurality of search information elements is given by a leaf of the tree structure or given by a sub-tree of the tree structure consisting of a node and an arbitrary set of leaves or nodes of lower levels linked to the node, and contains structural information corresponding to said plurality of search information elements;
   said apparatus comprising:
      a structural information compressor that removes redundant information from said structural information corresponding to said plurality of search information elements whereby to reduce a total quantity of said structural information; and
      a unit search information formation section that forms a unit of search information by arranging (i) record position information corresponding to each of said plurality of search information elements only of the same type, representing a position where the corresponding search information element is recorded, and (ii) said structural information compressed by said structural information compressor, in accordance with a prescribed format, wherein
      said structural information compressor separates said structural information into shared structural information including type information shared by said plurality of search information elements or shared position information of said tree structure, and un-shared structural information other than said shared structural information; and
      said unit search information formation section forms said unit of search information by arranging, in addition to said arrangement of said record position information, said shared structural information and said un-shared structural information.

6. The search information managing apparatus according to claim 5, wherein
   said plurality of search information elements correspond to signal search information representing physical characteristics of signals of said moving image contents.

7. The search information managing apparatus according to claim 5, wherein
   said plurality of search information elements correspond to semantic search information representing characteristics in semantic context of said moving image contents.

8. The search information managing apparatus according to claim 5, wherein
   said prescribed format represents an arrangement of said record position information in accordance with an order of appearance of search information elements corresponding to said record position information in said tree structure.

9. A search information managing method managing search information stored on a tangible machine-readable medium, having a tree structure corresponding to moving image contents, wherein:

said search information contains a plurality of search information elements of a same type attached to a same hierarchical level of the tree structure, wherein each of said plurality of search information elements is given by a leaf of the tree structure or given by a sub-tree of the tree structure consisting of a node and an arbitrary set of leaves or nodes of lower levels linked to the node, and contains structural information corresponding to said plurality of search information elements; said method comprising the following steps:

a structural information compressing step of removing redundant information from said structural information corresponding to said plurality of search information elements whereby to reduce a total quantity of said structural information; and a unit search information forming step of forming a unit of search information by arranging said plurality of search information elements only of the same type and corresponding said structural information compressed by said structural information compressing step in accordance with a prescribed format, wherein said structural information compressing step separates said structural information into shared structural information including type information shared by said plurality of search information elements or shared position information of said tree structure, and un-shared structural information other than said shared structural information; and said unit search information forming step forms a unit of search information by arranging, in addition to said arrangement of said plurality of search information elements, said shared structural information and said un-shared structural information.

10. A search information managing method managing units of search information stored on a tangible machine-readable medium, said units of search information formed from search information having a tree structure corresponding to moving image contents, wherein:

said search information contains a plurality of search information elements of a same type attached to a same hierarchical level of the tree structure, wherein each of said plurality of search information elements is given by a leaf of the tree structure or given by a sub-tree of the tree structure consisting of a node and an arbitrary set of leaves or nodes of lower levels linked to the node and contains structural information corresponding to said plurality of search information elements;

said method comprising the following steps:

a structural information compressing step of removing redundant information from said structural information corresponding to said plurality of search information elements whereby to reduce a total quantity of said structural information; and a unit search information forming step of forming a unit of search information by arranging (i) record position information corresponding to each of said plurality of search information elements of only the same type, representing a position where the corresponding search information element is recorded, and (ii) said structural information compressed by using said structural information compressing step, in accordance with a prescribed format, wherein said structural information compressing step separates said structural information into shared structural information including type information shared by said plurality of search information elements or shared position information of said tree structure, and un-shared structural information other than said shared structural information; and said unit search information forming step forms a unit of search information by arranging, in addition to said arrangement of said record position information corresponding to each of said plurality of search information elements only of the same type, said shared structural information and said un-shared structural information.

11. A search apparatus executing a search based on a unit of search information formed from search information stored on a tangible machine-readable medium, said search information having a tree structure corresponding to moving image contents, wherein said unit of search information is search information formed by arranging, for each of a plurality of search information elements given by a plurality of leaves of the tree structure or given by a plurality of sub-trees consisting of an arbitrary set of a node and leaves or nodes of lower levels linked to the node of the tree structure representing elements only of a same type attached to a same hierarchical level of the tree structure included in said search information, record position information representing a position where the search information element is recorded and corresponding structural information compressed from said search information and having redundant information removed from said structural information whereby to reduce a total quantity of said extracted structural information, in a prescribed format, wherein said structural information is compressed so as to separate said structural information into shared structural information including type information shared by said plurality of search information elements or shared position information of said tree structure, and un-shared structural information other than said shared structural information; and said unit search information forms a unit of search information by arranging, in addition to said arrangement of said record position information the positions where each of said plurality of search information elements are recorded, said shared structural information and said un-shared structural information;

said search apparatus comprising:

first holding means for holding said unit of search information;

second holding means for holding said plurality of search information elements; and search executing means for executing a search of said moving image contents using said unit of search information and said plurality of search information elements.

12. A search information managing apparatus for recovering a part of search information from a unit of search information stored on a tangible machine-readable medium, said unit of search information being formed from search information having a tree structure corresponding to moving image contents, wherein said unit of search information is at least one of units of search information formed of semantic search information representing characteristics in semantic context of the moving image contents or signal search information representing physical characteristics of signals of the moving image contents, and includes structural information obtained by disassembling structural search information representing the structure of the moving image contents and removing redundant information from said structural information whereby to reduce a total quantity of said structural information, wherein the unit of search information is formed of only same type of search information element;

said apparatus comprising:

a position calculator for calculating, from said structural information included in said unit of search information, a position in said tree structure that corresponds to each of said semantic search information or said signal search information included in said unit of search information; and a recovering section that recovers a part of said search information, by connecting, to the position in said tree structure calculated by said position calculator, corresponding said semantic search information or said signal search information, wherein said structural information consists of shared structural information including type information shared by said plurality of search information elements or shared position information of said tree structure, and un-shared structural information other than said shared structural information; and said unit of search information is formed by arranging, in addition to said arrangement of said plurality of search information elements, said shared structural information and said unshared structural information.

13. A search information managing apparatus for recovering a part of search information from a unit of search information stored on a tangible machine-readable medium, said unit of search information having been obtained by dividing search information having a tree structure corresponding to moving image contents, wherein said unit of search information is formed by arranging, in a prescribed format, a plurality of search information elements only of a same type attached to a same hierarchical level of the tree structure included in said search information, wherein each of said plurality of search information elements is given by a leaf of the tree structure or given by a sub-tree of the tree structure consisting of a node and an arbitrary set of leaves or nodes of lower levels linked to the node, and structural information corresponding to said plurality of search information elements being compressed wherein redundant information has been removed from structural information originally contained in said search information whereby to reduce a total quantity of said structural information;

said apparatus comprising:

a position calculator for calculating, from said structural information included in said unit of search information, a position in said tree structure that corresponds to each of said plurality of search information elements included in said unit of search information; and a recovery section that recovers a part of said search information, by connecting, to the position in said tree structure calculated by said position calculator, each of said corresponding plurality of search information elements as a leaf or a sub-tree, wherein said structural information consists of shared structural information including type information shared by said plurality of search information elements or shared position information of said tree structure, and un-shared structural information other than said shared structural information; and said unit of search information is formed by arranging, in addition to said arrangement of said plurality of search information elements, said shared structural information and said unshared structural information.

14. A search information managing apparatus for recovering a part of said search information from a unit of search information stored on a tangible machine-readable medium, said unit of search information formed from said search information having a tree structure corresponding to moving image contents, wherein said unit of search information is formed by arranging, for each of a plurality of search information elements only of a same type attached to a same hierarchical level of the tree structure included in said search information, record position information indicating a position where the corresponding search information element is recorded, wherein each of said plurality of search information elements is given by a leaf of the tree structure or given by a sub-tree of the tree structure consisting of a node and an arbitrary set of leaves or nodes of lower levels linked to the node, and the structural information corresponding to said plurality of search information elements being extracted wherein redundant information has been removed from structural information originally contained in said search information whereby to reduce a total quantity of structural information;

said apparatus comprising:

a position calculator for calculating, from said structural information included in said unit of search information, a position in said tree structure corresponding to each of said plurality of search information elements indicated by said record position information included in said unit of search information;

a search information element acquisition section that obtains a corresponding plurality of search information elements based on said record position information included in said unit of search information; and a recovery section that recovers a part of said search information by connecting, to the position in said tree structure calculated by said position calculator, said corresponding plurality of search information elements obtained by said search information element acquisition section wherein said structural information consists of shared structural information including type information shared by said plurality of search information elements or shared position information of said tree structure, and unshared structural information other than said shared structural information; and said unit of search information is formed by arranging, in addition to said arrangement of said record position information, said shared structural information and said un-shared structural information.

15. The search information managing apparatus according to claim 1, wherein said structural information includes information representing an original position of said plurality of search information elements in said tree structure of said search information.

16. The search information managing apparatus according to claim 1, wherein said structural information includes information representing a time section of said moving image contents, and said time section of said moving image contents corresponds to said plurality of search information elements.

17. The search information managing apparatus according to claim 5, wherein
said structural information includes information representing position of said plurality of search information elements in said tree structure of said search information.

18. The search information managing apparatus according to claim 5, wherein
said structural information includes information representing a time section of said moving image contents, and said time section of said moving image contents corresponds to said plurality of search information elements.

19. The search information managing apparatus according to claim 13, wherein
said prescribed format represents said plurality of search information elements included in said unit of search information arranged in accordance with an order of appearance thereof in said tree structure.

20. The search information managing apparatus according to claim 14, wherein
said prescribed format represents said record position information included in said unit of search information respectively arranged in accordance with an order of appearance of said plurality of search information elements corresponding to said record position information in said tree structure.

21. The search information managing apparatus according to claim 1, wherein a single unit of search information is formed from the plurality of search information element.

* * * * *